(12) United States Patent
Lu et al.

(10) Patent No.: US 12,302,415 B2
(45) Date of Patent: May 13, 2025

(54) METHOD FOR GUIDING SMART DEVICE TO CONNECT TO NETWORK, MEDIUM, CONTROL TERMINAL, AND SYSTEM

(71) Applicant: Petal Cloud Technology Co., Ltd., Guangdong Province (CN)

(72) Inventors: Zhimin Lu, Nanjing (CN); Puchao Zhang, Dublin (IE)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 490 days.

(21) Appl. No.: 17/794,455

(22) PCT Filed: Jan. 7, 2021

(86) PCT No.: PCT/CN2021/070693
§ 371 (c)(1),
(2) Date: Jul. 21, 2022

(87) PCT Pub. No.: WO2021/147686
PCT Pub. Date: Jul. 29, 2021

(65) Prior Publication Data
US 2023/0068641 A1    Mar. 2, 2023

(30) Foreign Application Priority Data
Jan. 21, 2020  (CN) .......................... 202010071559.9

(51) Int. Cl.
*H04W 76/10* (2018.01)
*H04L 12/28* (2006.01)
(Continued)

(52) U.S. Cl.
CPC ......... *H04W 76/10* (2018.02); *H04L 12/2809* (2013.01); *H04L 12/2825* (2013.01);
(Continued)

(58) Field of Classification Search
CPC ..... H04W 76/10; H04W 48/16; H04W 48/10; H04W 84/12; H04L 12/2809; H04L 12/2825; H04L 12/2834
See application file for complete search history.

(56) References Cited

U.S. PATENT DOCUMENTS

| | | |
|---|---|---|
| 2013/0132467 A1 | 5/2013 | Kim et al. |
| 2018/0159958 A1 | 6/2018 | Olive et al. |
| 2019/0297495 A1 | 9/2019 | Aggarwal et al. |

FOREIGN PATENT DOCUMENTS

| | | |
|---|---|---|
| CN | 104506360 A | 4/2015 |
| CN | 105785786 A | 7/2016 |

(Continued)

OTHER PUBLICATIONS

Zheng Han Andrew, "802.11 protocol frame format, Wi-Fi connection interaction process, wireless cracking entry research," Apr. 30, 2014, 16 pages.

(Continued)

*Primary Examiner* — Shirley X Zhang
(74) *Attorney, Agent, or Firm* — Conley Rose, P.C.

(57) ABSTRACT

A method for guiding a smart device to connect to a wireless network includes that the smart device sends a device identifier (ID) and a cloud service address that are of the smart device to a control terminal. The control terminal obtains, from a corresponding cloud server based on the received device ID and the cloud service address, network configuration information for the smart device to connect to the wireless network, determines, based on the network configuration information, a management application that is of the smart device and that is provided by a manufacturer, and then downloads the management application. After the download is complete, the control terminal sends the obtained network configuration information to the management application. The management application uses the (Continued)

network configuration information to guide the smart device to connect to the wireless network.

20 Claims, 23 Drawing Sheets

(51) Int. Cl.
*H04W 48/10* (2009.01)
*H04W 48/16* (2009.01)
*H04W 84/12* (2009.01)

(52) U.S. Cl.
CPC ......... *H04L 12/2834* (2013.01); *H04W 48/16* (2013.01); *H04W 48/10* (2013.01); *H04W 84/12* (2013.01)

(56) References Cited

FOREIGN PATENT DOCUMENTS

| | | | | |
|---|---|---|---|---|
| CN | 105915420 A | | 8/2016 | |
| CN | 106302762 A | | 1/2017 | |
| CN | 106878923 A | * | 6/2017 | ............. H04L 67/10 |
| CN | 107171903 A | * | 9/2017 | |
| CN | 107493212 A | * | 12/2017 | ......... H04L 12/2807 |
| CN | 108234220 A | | 6/2018 | |
| CN | 108693784 A | | 10/2018 | |
| CN | 109981312 A | * | 7/2019 | |
| CN | 110692280 A | * | 1/2020 | ......... H04L 12/2869 |
| CN | 110784367 A | | 2/2020 | |
| CN | 110995665 A | * | 4/2020 | ......... H04L 41/0803 |
| CN | 111246545 A | | 6/2020 | |
| CN | 113273151 A | * | 8/2021 | |
| WO | 2018112002 A1 | | 6/2018 | |
| WO | WO-2019153143 A1 | * | 8/2019 | ......... H04L 12/2869 |

OTHER PUBLICATIONS

Tencent, "AirKiss overview and application scenarios," 2012, 4 pages.

Hp15575865420, "Android hotspot development, WiFi hotspot communication," Oct. 29, 2017, 5 pages.

Anquanke, "Interpretation of Defcon China Topics | Security Analysis of SmartCfg Wireless Distribution Network Solution," May 14, 2018, 7 pages.

* cited by examiner

∨ IEEE 802.11 wireless LAN
  ∨ Tagged parameters (151 bytes)
    > Tag: SSID parameter set: Wildcard SSID
    > Tag: Supported Rates 6(B), 9, 12(B), 18, 24(B), 36, 48, 54, [Mbit/sec]
    > Tag: DS Parameter set: Current Channel: 48
    > Tag: HT Capabilities (802.11n D1.10)
    > Tag: Extended Capabilities (8 octets)
    > Tag: VHT Capabilities
    > Tag: IOT Device Service URL
    > Tag: IOT Device ManufacturerId
    > Tag: IOT Device TypeID
    > Tag: IOT Device Init tag
    > Tag: IOT Device sign Value
    > Tag: IOT Device package Name
    > Tag:

FIG. 11

∨ IEEE 802.11 wireless LAN
  ∨ Tagged parameters (151 bytes)
    > Tag: SSID parameter set: Wildcard SSID
    > Tag: Supported Rates 6(B), 9, 12(B), 18, 24(B), 36, 48, 54, [Mbit/sec]
    > Tag: DS Parameter set: Current Channel: 48
    > Tag: HT Capabilities (802.11n D1.10)
    > Tag: Extended Capabilities (8 octets)
    > Tag: VHT Capabilities
    > Tag: Support IOT Device init

FIG. 12

METHOD FOR GUIDING SMART DEVICE TO CONNECT TO NETWORK, MEDIUM, CONTROL TERMINAL, AND SYSTEM

CROSS-REFERENCE TO RELATED APPLICATIONS

This is a U.S. National Stage of International Patent Application No. PCT/CN2021/070693 filed on Jan. 7, 2021, which claims priority to Chinese Patent Application No. 202010071559.9 filed on Jan. 21, 2020. Both of the aforementioned applications are hereby incorporated by reference in their entireties.

TECHNICAL FIELD

This application relates to a method for guiding a smart device to connect to a network, a medium, a control terminal, and a system.

BACKGROUND

With the rise of the Internet of Things, smart home devices are popularized to some extent, and smart devices are more widely used in daily life. After purchasing a smart device (for example, a power strip, an air purifier, or a desk lamp), a user usually needs to first connect the smart device to a wireless communications network, for example, a Wi-Fi network, before using the smart device for the first time. When connecting the smart device to a network, the user usually needs to first install, on a control terminal such as a mobile phone, a device management application (application, APP) of a manufacturer, and then connect the smart device to the network on the device management APP of the manufacturer according to guidance (this process is briefly referred to as "network configuration" in this application).

The user may have smart devices from different manufacturers. Devices from different manufacturers usually require different device management APPs to support network configuration. Therefore, the user needs to download APPs of different manufacturers and complete network configuration on each of the APPs of different manufacturers.

SUMMARY

An objective of this application is to provide a solution for guiding network configuration of a device, to simplify a network configuration operation of a smart device.

A first aspect of this application provides a method for guiding a smart device to connect to a wireless network. The method may include: a smart device sends a device ID and a cloud service address that are of the smart device to a control terminal; the control terminal receives the device ID and the cloud service address that are sent by the smart device, and sends, based on the device ID, a network configuration information obtaining request to a cloud server corresponding to the cloud service address, where the information obtaining request is used to obtain network configuration information required by the smart device to access a wireless network; the cloud server sends the network configuration information to the control terminal in response to the received network configuration information obtaining request sent by the control terminal; the control terminal receives the network configuration information, and determines a management application of the smart device based on the network configuration information; and the control terminal sends the network configuration information to the management application, where the network configuration information can be used by the management application to guide the smart device to connect to a wireless network.

In this application, the device management APP corresponding to the smart device is automatically determined through interaction between the control terminal, the smart device, and the cloud server of the smart device, and a user does not need to actively search for or download the device management APP of the smart device, thereby simplifying a network configuration operation of the smart device.

In an implementation, the control terminal in the foregoing method may communicate with the smart device by using a Wi-Fi protocol. The control terminal may be used as an access point, and the smart device may be used as a station to connect to Wi-Fi created by the control terminal. That is, before the smart device sends a device ID and a cloud service address that are of the smart device to a control terminal, the foregoing method may further include: the control terminal sends a first Wi-Fi broadcast signal; and that the smart device sends a device ID and a cloud service address that are of the smart device may specifically include: the smart device sends a first probe request signal based on the received first Wi-Fi broadcast signal, where the first probe request signal includes the device ID and the cloud service address.

In another implementation, the control terminal and the smart device in the foregoing method may still communicate with each other by using a Wi-Fi protocol. However, the smart device may be used as an access point, and the control terminal is used as a station to connect to Wi-Fi created by the smart device. Before the smart device sends a device ID and a cloud service address that are of the smart device to a control terminal, the method may further include: the smart device sends a second Wi-Fi broadcast signal; and the control terminal sends a second probe request signal to the smart device based on the received second Wi-Fi broadcast signal; and that the smart device sends a device ID and a cloud service address that are of the smart device may include: the smart device sends a second probe response signal based on the received second probe request signal, where the second probe response signal includes the device ID and the cloud service address.

Further, before the control terminal sends the network configuration information to the management application, the method may further include: the control terminal downloads the determined management application of the smart device from the cloud server, and installs the management application.

Further, before the control terminal sends the network configuration information to the management application, the method may further include: the control terminal determines that the management application of the smart device is installed on the control terminal, and guides a user to open the management application.

In the solutions provided in this application, the control terminal interacts with the intelligent device to automatically determine the device management APP corresponding to the smart device, and guides the user to download and install or directly open the device management APP corresponding to the smart device, thereby simplifying an operation of connecting to a wireless network by the smart device.

A second aspect of this application provides another method for guiding a smart device to connect to a wireless network. The method may be performed by a control terminal, and includes: the control terminal receives a device ID and a cloud service address that are of a smart device and that are sent by the smart device; the control terminal obtains, based on the device ID and from a cloud server corresponding to the cloud service address, network configuration information required by the smart device to connect to a wireless network, and determines a management application of the smart device; and the control terminal sends the network configuration information to the management application, where the network configuration information can be used by the management application to guide the smart device to connect to the wireless network.

In this application, the control terminal obtains the information sent by the smart device to automatically determine the device management APP corresponding to the smart device, and a user does not need to actively search for or download the device management APP of the smart device, thereby simplifying a network configuration operation of the smart device.

Further, before the control terminal sends the network configuration information to the management application, the method may further include: the control terminal downloads the determined management application of the smart device from the cloud server corresponding to the cloud service address, and installs the management application. The control terminal automatically downloads the device management APP based on the device ID and the cloud service address. A user does not need to manually search for and download the device management APP, thereby simplifying a network configuration operation.

Further, before the control terminal sends the network configuration information to the management application, the method may further include: the control terminal determines that the determined management application of the smart device is installed on the control terminal; and the control terminal guides a user to open the management application. When the corresponding device management APP has been installed on the control terminal, the control terminal directly prompts the user and opens the device management APP, thereby simplifying a network configuration operation.

Further, before the control terminal sends the network configuration information to the management application, the method may further include: the control terminal obtains network information of a wireless network that is selected by a user and to which the smart device is to connect; and the control terminal verifies an identity of the user, and when the verification succeeds, the control terminal sends the network information of the wireless network to the management application, where the network information can be used by the management application to connect the smart device to the wireless network selected by the user.

In an implementation, the control terminal in the foregoing method may communicate with the smart device by using a Wi-Fi protocol. The control terminal may be used as an access point, and the smart device is used as a station to connect to Wi-Fi created by the control terminal. That is, before the control terminal receives a device ID and a cloud service address that are of a smart device and that are sent by the smart device, the method may further include: the control terminal sends a first Wi-Fi broadcast signal; and that the control terminal receives a device ID and a cloud service address that are of a smart device and that are sent by the smart device may include: the control terminal receives a first probe request signal from the smart device, where the first probe request signal includes the device ID and the cloud service address, and the first probe request signal is sent by the smart device based on the received first Wi-Fi broadcast signal sent by the control terminal.

Further, the Wi-Fi broadcast signal includes information indicating that connection of the smart device to a wireless network is supported. Therefore, it is convenient for the smart device to determine and connect to a Wi-Fi network. For example, when receiving a plurality of Wi-Fi broadcast signals, the smart device may preferentially connect to a Wi-Fi network that carries information indicating that connection of the smart device to the wireless network is supported.

Further, the method may further include: the control terminal receives from the management application, a message indicating that the smart device connects to the wireless network; and the control terminal displays information indicating that network configuration of the smart device succeeds, and disables the Wi-Fi broadcast.

In another implementation, the control terminal and the smart device in the foregoing method may communicate with each other may communicate with each other by using a Wi-Fi protocol. However, the smart device may be used as an access point, and the control terminal is used as a station to connect to Wi-Fi created by the smart device. That is, before the control terminal receives a device ID and a cloud service address that are sent by the smart device, the method may further include: the control terminal receives a second Wi-Fi broadcast signal sent by the smart device; and the control terminal sends a second probe request signal to the smart device; and that the control terminal receives a device ID and a cloud service address that are of a smart device and that are sent by the smart device includes: the control terminal receives a second probe response signal from the smart device, where the second probe response signal includes the device ID and the cloud service address, and the second probe response signal is sent by the smart device based on the received second probe request signal.

Further, before the control terminal sends the network configuration information to the management application, the method may further include: the control terminal downloads the determined management application of the smart device from the cloud server corresponding to the cloud service address, and establishes a Wi-Fi connection to the smart device after the management application is downloaded. An occasion at which the control terminal establishes the Wi-Fi connection to the smart device is set to a time period after the device management APP is downloaded, but not a time period before the management APP is downloaded, so that frequent network switching of the control terminal can be avoided.

Certainly, in some implementations, an occasion at which the control terminal establishes the Wi-Fi connection to the smart device may alternatively be set to a time period before the management APP is downloaded. When the device management APP needs to be downloaded, the control terminal disconnects from the Wi-Fi created by the smart device, and re-connects to the Wi-Fi created by the smart device after the downloading is completed.

Further, the method may further include: the control terminal receives from the management application, a message indicating that the smart device connects to the wireless network; and the control terminal displays information indicating that network configuration of the smart device succeeds, and disconnects the Wi-Fi connection to the smart device.

By using either of the foregoing two network configuration manners, the control terminal may automatically determine the device management APP corresponding to the smart device, and guide the user to download and install or directly open the device management APP corresponding to the smart device, thereby simplifying an operation of connecting to a wireless network by the smart device. In addition, when the network configuration operation of the smart device is performed by using the device management APP, because the control terminal has established a communication connection to the smart device, in a network configuration process, a password of a wireless network to which the smart device is to connect does not need to be broadcast, so that security of the network configuration process can be improved.

Further, before the control terminal sends a first Wi-Fi broadcast signal, the method includes: the control terminal displays a user interface, where the user interface includes a first mode and a second mode; and the control terminal determines that the first mode is selected. Alternatively, before the control terminal sends a second Wi-Fi broadcast signal, the method includes: the control terminal displays a user interface, where the user interface includes a first mode and a second mode; and the control terminal determines that the second mode is selected.

In this way, the user can perform a network configuration operation by entering the interface provided in this embodiment of this application, and does not need to separately search for, download, and perform an operation on different management applications for different smart devices.

Further, after the control terminal determines the management application of the smart device, the user interface further includes at least some of the network configuration information of the smart device and corresponding information that is related to the management application, and an interaction option used to guide a user to download or open the management application.

In this way, by using the solution provided in this embodiment of this application, the user can conveniently view and manage a smart device that waits for network configuration and a smart device on which network configuration has been performed.

A third aspect of this application provides still another method for guiding a smart device to connect to a wireless network. The method may include: a control terminal receives a first device ID and a first cloud service address that are of a first smart device and that are sent by the first smart device; the control terminal obtains, from a cloud server corresponding to the first cloud service address and based on the first device ID, first network configuration information required by the first smart device to connect to a wireless network, and determines a first management application of the first smart device; and the control terminal sends the first network configuration information to the first management application, where the first network configuration information can be used by the first management application to guide the first smart device to connect to a wireless network; and the control terminal receives a second device ID and a second cloud service address that are of a second smart device and that are sent by the second smart device; the control terminal obtains, from a cloud server corresponding to the second cloud service address and based on the second device ID, second network configuration information required by the second smart device to connect to a wireless network, and determines a second management application of the second smart device; and the control terminal sends the second network configuration information to the second management application, where the second network configuration information can be used by the second management application to guide the second smart device to connect to a wireless network. In other words, the control terminal provided in this embodiment of this application may provide network configuration services for a plurality of smart devices. The plurality of smart devices may be provided by a same manufacturer, or may be provided by different manufacturers.

A fourth aspect of this application provides a machine readable medium. The machine readable medium can store instructions. When the instructions are run by a machine, the machine can perform the method provided in any one of the second aspect, the third aspect, the implementations of the second aspect, or the implementations of the third aspect.

A fifth aspect of this application provides a control terminal, including a memory and a processor, where the memory stores instructions, and the processor is configured to read and execute the instructions in the memory, so that the control terminal performs the method provided in any one of the second aspect, the third aspect, the implementations of the second aspect, or the implementations of the third aspect.

A sixth aspect of this application provides a system. The system may include the control terminal and the smart device provided in any one of the fifth aspect or the implementations of the fifth aspect.

A seventh aspect of this application provides an apparatus. The apparatus has a function of implementing the method provided in any one of the second aspect, the third aspect, the implementations of the second aspect, or the implementations of the third aspect. The function may be implemented by hardware, or may be implemented by hardware executing corresponding software. The hardware or software includes one or more modules corresponding to the foregoing function.

An eighth aspect of this application provides a computer program product. The computer program product includes program code, and when the computer program product is executed by a controller, the controller performs the method provided in any one of the second aspect, the third aspect, the implementations of the second aspect, or the implementations of the third aspect. The computer program product may be a software installation package. When the method provided in any one of the second aspect, the third aspect, the implementations of the second aspect, or the implementations of the third aspect needs to be used, the computer program product may be downloaded to the controller, and the computer program product may be run on the controller.

In the foregoing embodiments provided in this application, the control terminal can interact with the smart device to automatically determine the device management APP corresponding to the smart device, and guide the user to download and install or directly open the device management APP corresponding to the smart device, thereby simplifying a network configuration operation of the smart device. In addition, when the network configuration operation of the smart device is performed by using the device management APP, because the control terminal has established a communication connection to the smart device, in a network configuration process, a password of a wireless network to which the smart device is to connect does not need to be broadcast, so that security of the network configuration process can be improved.

BRIEF DESCRIPTION OF DRAWINGS

FIG. 11 shows an example of an extension field in a probe request message sent by a smart device according to an embodiment of this application;

FIG. 12 shows an example of an extension field in a probe response message sent by a mobile phone according to an embodiment of this application;

DESCRIPTION OF EMBODIMENTS

Figure 1:
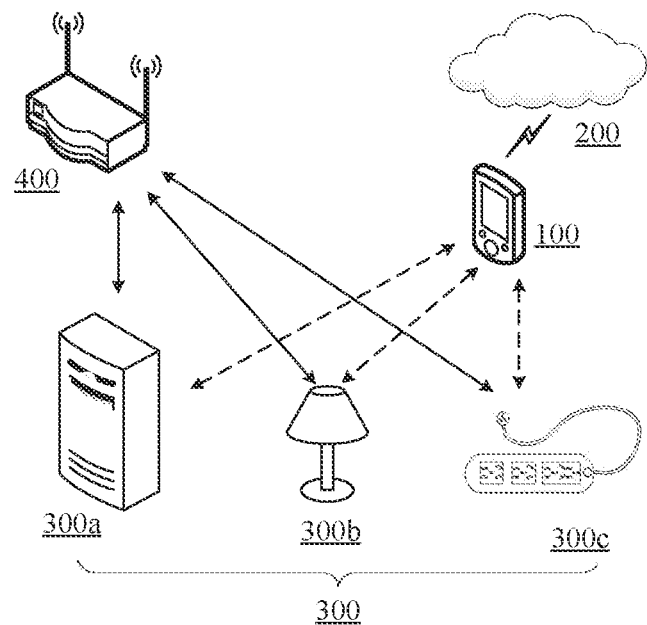
FIG. 1 shows an example of a scenario of network configuration of a device according to an embodiment of this application.

The following further describes this application with reference to specific embodiments and the accompanying drawings. It may be understood that the specific embodiments described herein are merely intended to explain this application, but not to limit this application. In addition, for ease of description, the accompanying drawings show only some but not all structures or processes related to this application. It should be noted that in this specification, similar reference numerals and letters represent similar items in the following figures.

Illustrative embodiments of this application include but are not limited to a method for guiding a device to connect to a network, a medium, a control terminal, and a system.

Aspects of the illustrative embodiments will be described using terms commonly used by persons skilled in the art to communicate the essence of their work to other persons skilled in the art. However, it will be apparent to persons skilled in the art that some alternative embodiments may be implemented using some features described below. For purposes of explanation, specific numbers and configurations are used in descriptions for a more thorough understanding of the illustrative embodiments. However, it will be apparent to persons skilled in the art that alternative embodiments may be implemented without specific details. In some other cases, some well-known features are omitted or simplified herein to avoid obscuring the illustrative embodiments of this application.

To make the objectives, technical solutions, and advantages of this application clearer, the following further describes implementations of this application in detail with reference to the accompanying drawings.

As smart home devices are increasingly popularized, smart devices are more widely used in daily life. After purchasing a smart device (for example, a power strip, an air purifier, or a desk lamp), a user usually needs to connect the smart device to a network to facilitate control by the user. In this application, a process of guiding a smart device to connect to a network may be briefly referred to as "network configuration". In embodiments of this application, a smart device may include various devices that can interact with a cloud or another device through a network.

FIG. 1 shows an example of a scenario of network configuration of a device according to some embodiments of this application. In FIG. 1 and the remaining figures, a reference numeral followed by a letter, such as "300a", represents a reference to an element having that specified reference numeral, and a reference numeral without being followed by a letter, such as "300", represents a general reference to an implementation of an element having that reference numeral.

As shown in FIG. 1, after a smart device 300 such as a smart air purifier 300a, a smart desk lamp 300b, and a smart power strip 300c is purchased, the smart device 300 usually needs to be connected to a network before being used. If the smart device 300 needs to be connected to a network, for example, home Wi-Fi provided by a wireless access point 400 such as a router shown in FIG. 1, a user usually needs to perform corresponding configuration by using a control terminal 100 such as a mobile phone. For example, the user may download, from a cloud server 200 of the device by using the mobile phone, a device management application (application, App) corresponding to the smart device 300, and perform a corresponding operation on the device management APP to complete network configuration of the device 300.

There are two common network configuration manners for the smart device 300.

In one manner, the smart device 300 is in an access point (access point, AP) mode, and creates a Wi-Fi hotspot. A user establishes a communication connection to the Wi-Fi hotspot of the device by using a device management APP on the mobile phone, and then sends, to the smart device, a name and a password that are of the home Wi-Fi provided by the wireless access point 400. Then, the smart device 300 connects to the home Wi-Fi based on the obtained name and password of the home Wi-Fi. In other words, in this network configuration manner, the smart device is used as an AP, and the mobile phone is used as a station (Station), to establish a Wi-Fi connection.

In the other manner, the smart device 300 is in a listening mode, and the user continuously broadcasts a name and a password that are encoded and that are of the home Wi-Fi provided by the wireless access point 400, through the device management APP on the mobile phone. The smart device 300 listens to the special radio broadcast frame, decodes the special radio broadcast frame, and connects to the home Wi-Fi. Then, the smart device 300 notifies, by using a broadcast packet or the like, the device management APP that network configuration succeeds. In other words, in this network configuration manner, the mobile phone is used as an AP, and the smart device is used as a station, to establish a Wi-Fi connection.

In either of the two manners, the user needs to download and install the device management APP and perform an operation on the APP to complete network configuration. In actual life, different smart devices may be from different manufacturers, and different manufacturers usually provide different device management APPs. For example, the air purifier 300a, the smart desk lamp 300b, and the smart power strip 300c shown in FIG. 1 may be from three manufacturers. In this case, the user needs to download device management APPs of the three manufacturers, and separately perform network configuration of a corresponding smart device 300 on each of the APPs.

The air purifier 300a, the desk lamp 300b, the power strip 300c, and the like shown in FIG. 1 are merely used as examples to describe the smart device 300. In various implementations of this application, the smart device 300 may include or refer to various types of devices that can interact with a cloud or another device through a network.

With development of smart devices, a scenario in which a plurality of smart devices 300 are used in a specific space becomes very common. This manner in which a user separately downloads and installs a device management APP of a manufacturer to perform network configuration brings many inconveniences. Therefore, an embodiment of this application provides a general APP to provide a network configuration guiding service.

According to some embodiments of this application, the general APP may be a common application that may be installed on a control terminal such as a mobile phone, and the APP may be named "device discovery App" in some embodiments of this application. In some cases, the device discovery APP may be directly pre-installed on the mobile phone, and an icon of the device discovery APP is displayed on a desktop of the mobile phone, so that a user can perform an operation on the device discovery APP pre-installed in the mobile phone, find a smart device 300 that waits for network configuration, and guide the network configuration. In addition, according to some embodiments of this application, the APP does not need to replace a device management APP of a manufacturer, but coexists with the device management APP of the manufacturer. In addition, after being confirmed by the user, the device discovery APP accesses a cloud service of the smart device 300, downloads and installs the device management APP of the manufacturer. The user can also view, on the device management APP of the manufacturer, a smart device 300 for which network configuration has been performed.

According to some embodiments of this application, the foregoing general APP that provides a network configuration guiding service may also be a system-level application. For example, the general APP may be embedded in an operating system of a control terminal such as a mobile phone. A user may find the function from a menu (for example, a "Settings" menu) of the operating system, and perform a corresponding operation to guide network configuration of a smart device.

With reference to FIG. 2 to FIG. 13C, a common application installed on the control terminal 100 is used as an example to describe an example of performing network configuration by using the device discovery APP according to embodiments of this application. Persons skilled in the art should understand that, in a case in which the device discovery APP is a system-level application, network configuration may also be performed by using a process similar to that described below.

Figure 2:
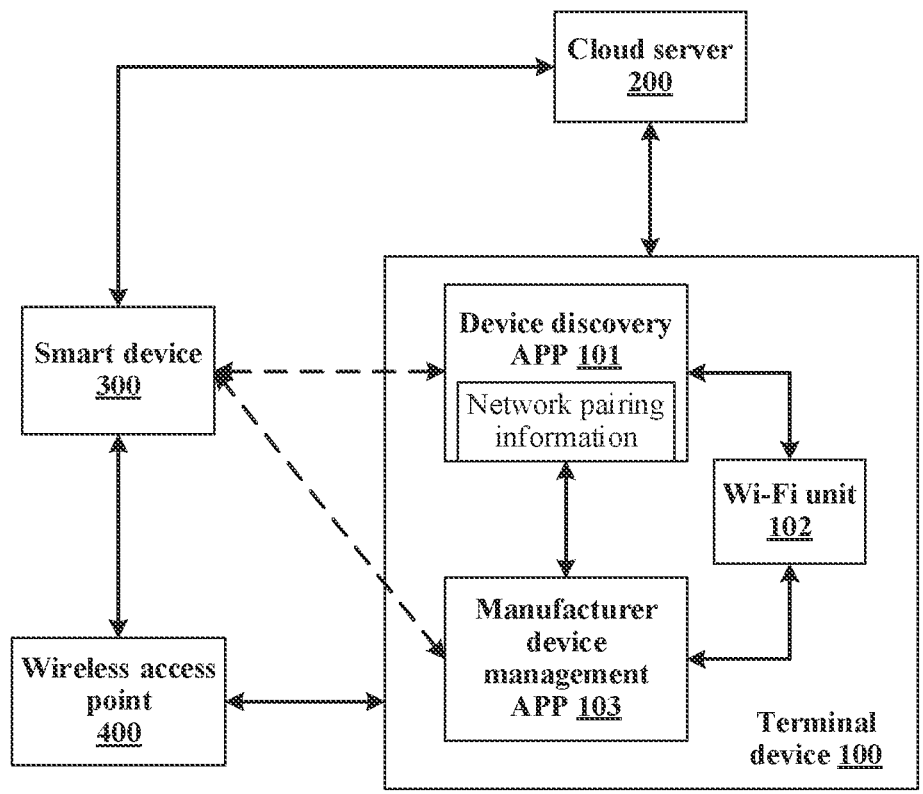
FIG. 2 shows an example of a system for performing network configuration by using a device discovery APP according to an embodiment of this application.

First, with reference to FIG. 2, an example of a system for performing network configuration by using a device discovery APP according to an embodiment of this application is described.

As shown in FIG. 2, the network configuration system may include a control terminal 100, a cloud server 200, a smart device 300, and a wireless access point 400.

The smart device 300 may include various devices that can interact with a cloud or another device by using a network and usually have wireless signal receiving and sending functions, for example, the smart air purifier 300a, the smart desk lamp 300b, and the smart power strip 300c shown in FIG. 1. In various implementations, an example of the smart device 300 may further include various smart home appliances such as a smart weight (body fat) scales, a smart light, a smart fan, a smart TV, a smart refrigerator, a smart speaker, and a smart sweeping robot, or various smart office devices such as a smart printer, a smart air conditioner, and a smart projecting device.

The cloud server 200 may be a hardware server, or may be embedded in a virtualization environment. For example, according to some embodiments of this application, the cloud server 200 may be a virtual machine executed on a hardware server including one or more other virtual machines. In some implementations, the cloud server 200 may interact with the control terminal 100 and/or the smart device 300 through a network, for example, send data to the control terminal 100 and receive data from the control terminal 100.

The wireless access point 400 is configured to provide a Wi-Fi signal. The wireless access point 400 may include a switching router device, or may include a pure access point device. Examples of the wireless access point 400 may include but are not limited to a wireless router, a MIFI device, and the like.

As a control terminal, the control terminal 100 may communicate with the cloud server 200, the smart device 300, and the wireless access point 400. According to some embodiments of this application, the control terminal 100 may be a computing device including a memory and a hardware processor, for example, a desktop computer, a laptop computer, a tablet computer, a mobile phone, a smart TV, a mobile email device, a portable game console, a portable music player, a reader device, a head mounted display, or various electronic devices that can access a network in a wireless manner. In some implementations, the control terminal 100 may be a wearable device that can be worn by a user. For example, the control terminal 100 may be a smartwatch, a band, jewelry (for example, a terminal device made into an ornament article such as an earring or a bracelet), glasses, or the like, or may be used as a part of a watch, a band, jewelry, glasses, or the like. An example of a hardware structure of the control terminal 100 and an example of a software architecture of the control terminal 100 are described below with reference to FIG. 14 and FIG. 15.

In various implementations, a user may view a message on a display of the control terminal 100, or may access a message by using a speaker of the control terminal 100 or another output device. For example, according to some embodiments of this application, the user may view information on a display of a mobile phone, a smartwatch, or a smart band. According to some other embodiments of this application, a user may access a message by using a headset, a speaker, a haptic feedback apparatus, or the like that is coupled to the control terminal 100 or that is used as a part of the control terminal 100.

According to some embodiments of this application, a device discovery APP 101 may be installed on the control terminal 100. The device discovery APP 101 is configured to provide a network configuration guiding service. As described above, because the smart device has two common network configuration manners, the device discovery APP 101 may also provide the network configuration guiding service in the two manners. In a manner, the control terminal 100 may be used as an AP, and a smart device 300 is correspondingly used as a station (Station). The device discovery APP 101 may send a signal to a Wi-Fi unit 102 of the control terminal 100, to control the Wi-Fi unit to enable a hotspot, so that a user can find, by using the device discovery App, the smart device 300 that is in a station (Station) mode and that waits for network configuration. In another manner, the smart device 300 may be used as an AP, and the control terminal 100 is used as a station (Station). The device discovery APP 101 sends a signal to the Wi-Fi unit 102 of the control terminal 100, to control the Wi-Fi unit 102 to enable Wi-Fi scanning, so that a user can find, by using the device discovery APP 101, the smart device 300 that is in an AP mode and that waits for network configuration.

After the smart device 300 is found by using the device discovery APP 101, the control terminal 100 may establish a communication connection to the smart device 300 after confirmation of the user, access a cloud service of the smart device 300 by using a device ID and a cloud service address that are sent by the smart device 300, and install a device management APP 103 of a manufacturer after authorization of the user. The device management APP 103 is usually provided by a device manufacturer, and is configured to manage a smart device 300 of each manufacturer. Device management APPs 103 of different manufacturers may have different names.

After the device management APP 103 is installed, the device discovery APP 101 sends related network configuration authorization information to the device management APP 103. The device management APP 103 of the manufacturer establishes a communication connection to the smart device 300 through the Wi-Fi unit of the control terminal 100, and performs a subsequent network configuration process. After the network configuration succeeds, the device management APP 103 may send a message indicating network configuration succeeds to the device discovery APP 101, so that the user can view, in the device discovery APP 101, the smart device 300 for which network configuration has been performed.

With reference to FIG. 3A to FIG. 13C, the following describes a network configuration process according to an embodiment of this application in detail by using an example in which a mobile phone is used as the control terminal 100 and a home Wi-Fi hotspot is used as the wireless access point 400. Persons skilled in the art should understand that, in different embodiments, the mobile phone may also be replaced with another control terminal, for example, a smart television or a smartwatch, and home Wi-Fi may also be replaced with another wireless network access point.

Figure 3A:
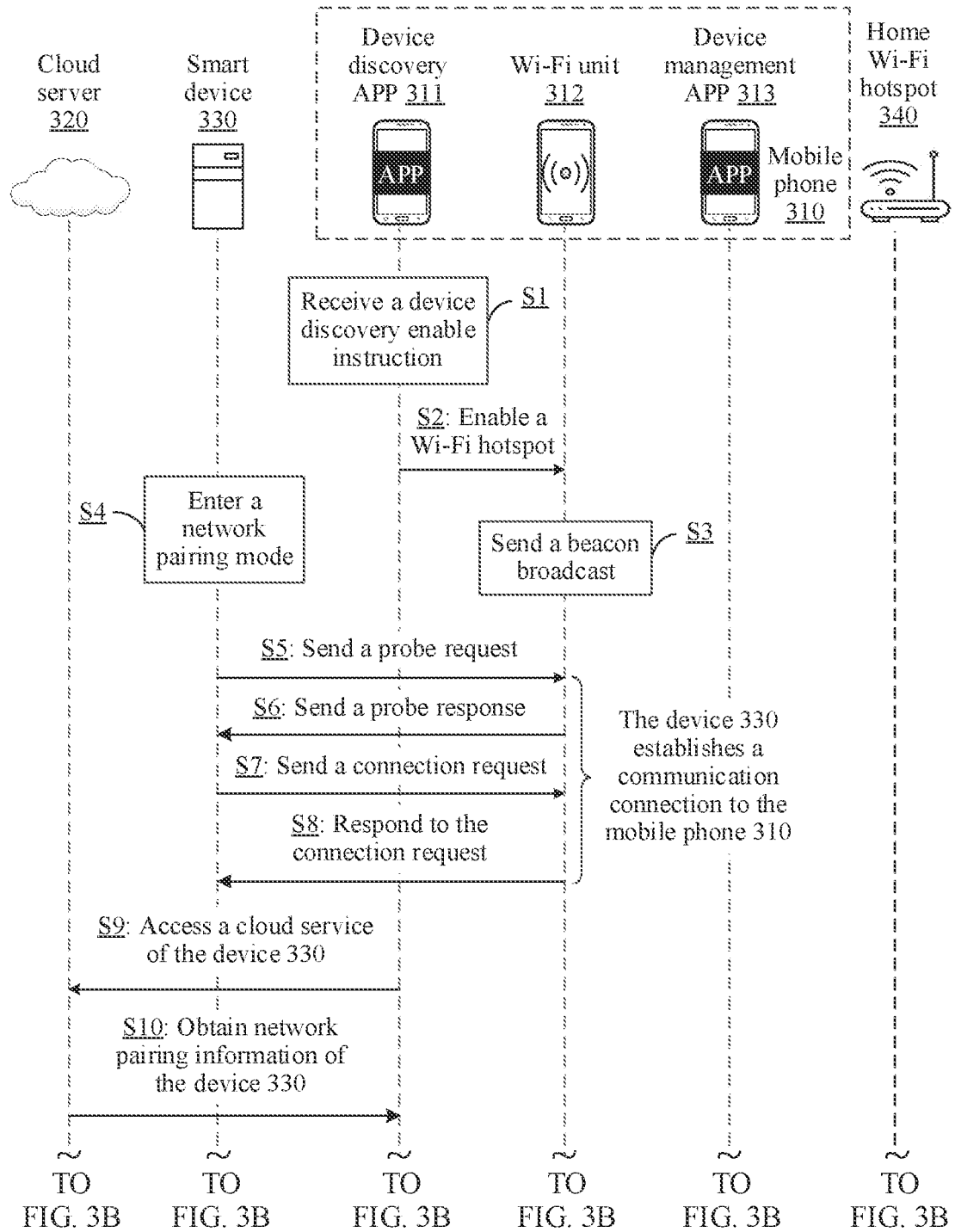
FIG. 3A to FIG. 3C show an example of a network configuration process in which a smart device is used as a station and a mobile phone is used as an AP according to an embodiment of this application.
Figure 3B:
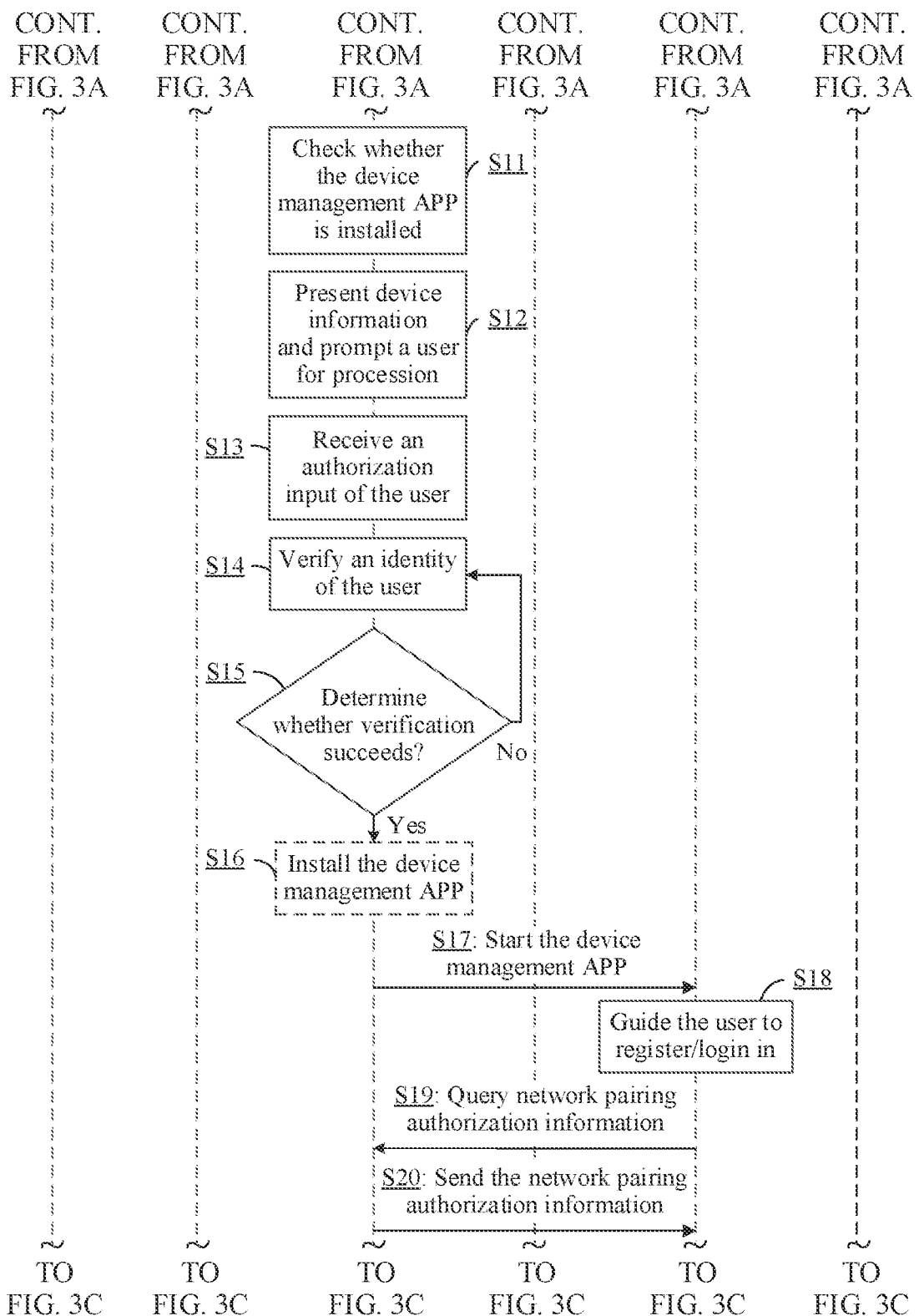
Figure 3C:
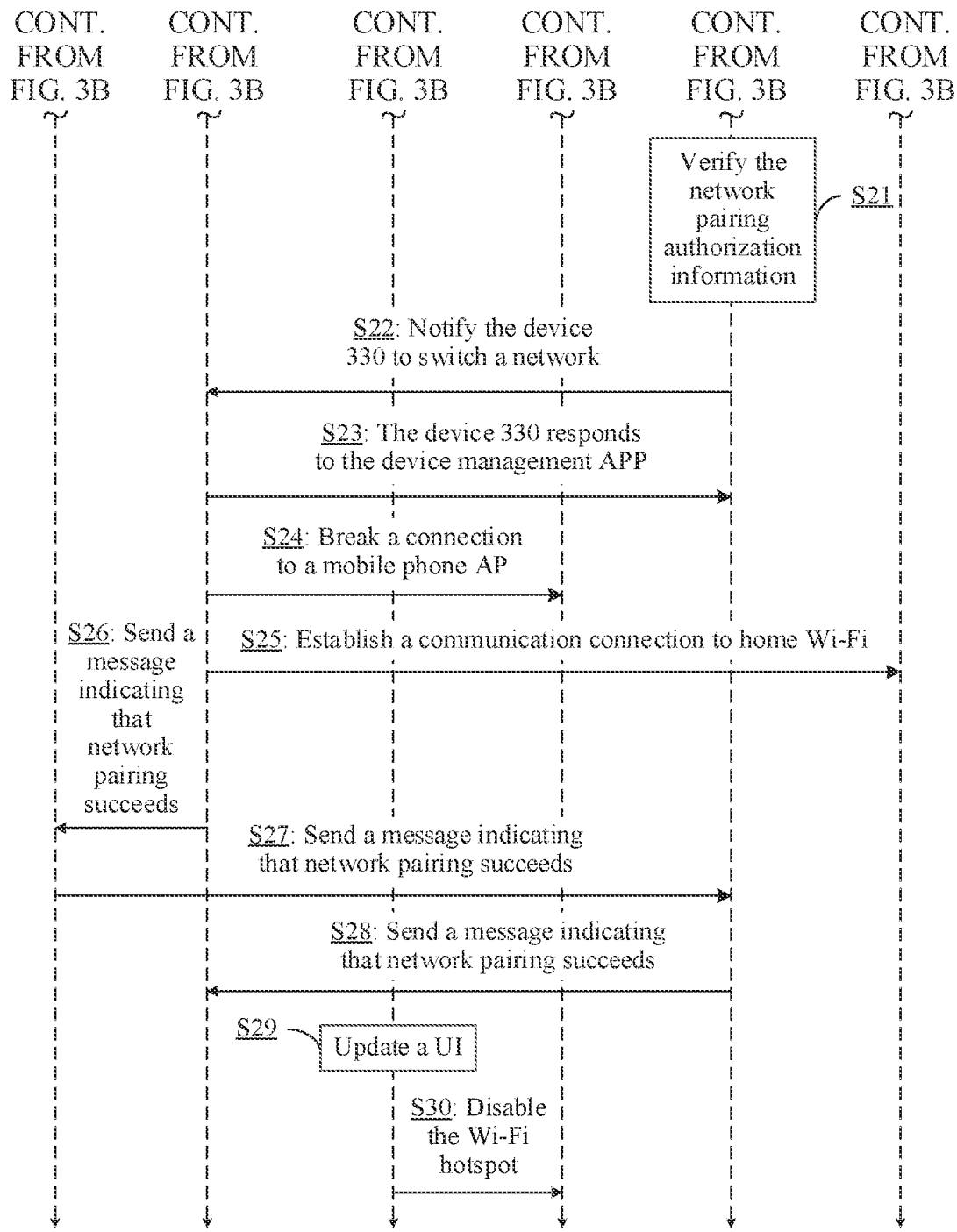

First, with reference to FIG. 3A to FIG. 3C, an example of a network configuration process in which a smart device is used as a station and a mobile phone is used as an AP is described.

S1: A user opens a device discovery APP 311 of a mobile phone 310, and enables a device discovery function in the device discovery APP 311.

Figure 4A:
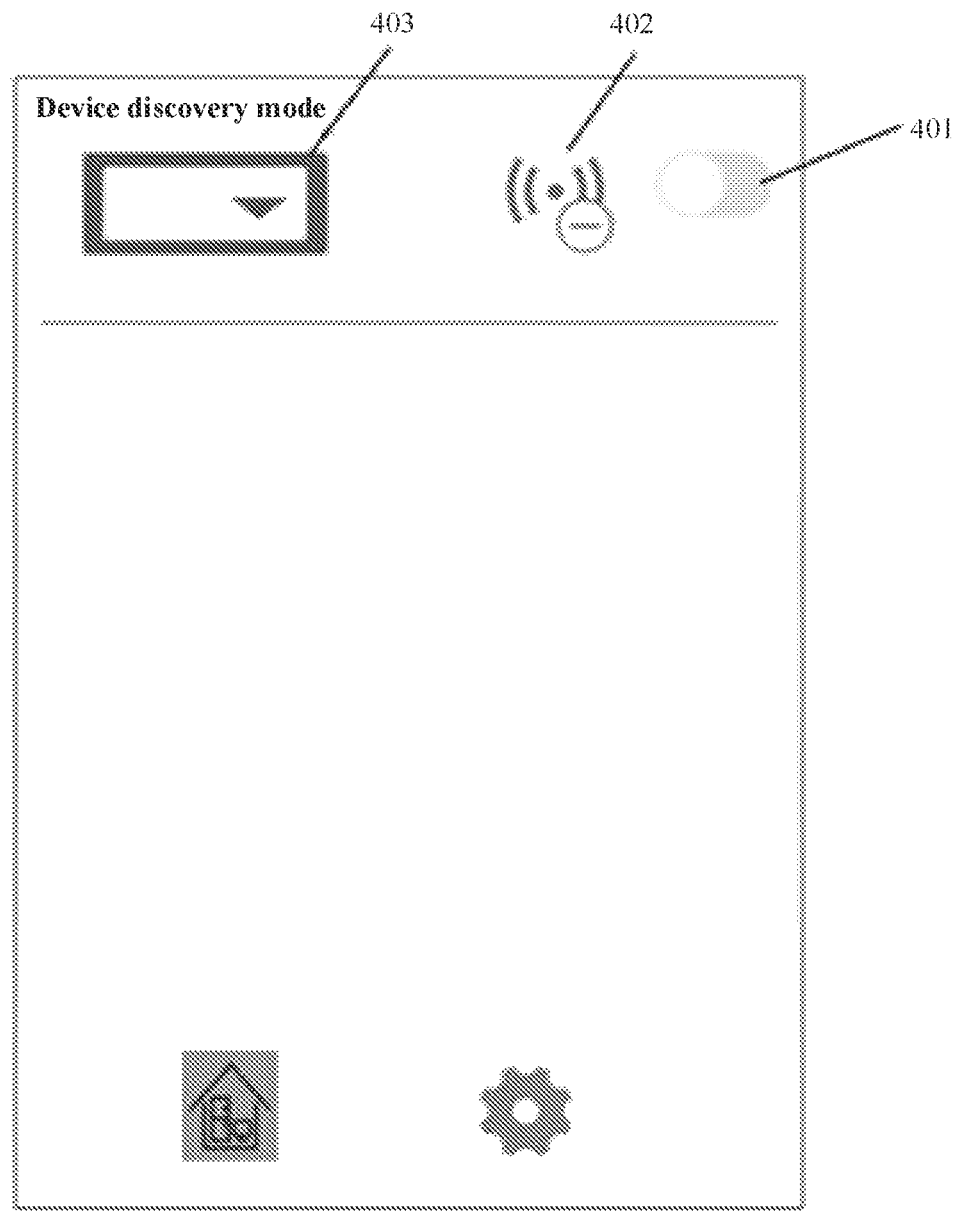
FIG. 4A shows an example of an initial user interface of a device discovery APP according to an embodiment of this application.

FIG. 4A shows an example of an initial user interface (user interface, UI) of the device discovery APP 311. As shown in FIG. 4A, the initial UI of the device discovery APP 311 may include a device discovery mode selection box 403, a signal identifier 402, and an enable button 401.

The device discovery APP 311 is initially in an initial state in which a mobile phone hotspot is not enabled. In the initial state, an indication indicating that the user enables the device discovery function may be received. According to some embodiments of this application, the user indication may be received in a form of selecting a user interface element (for example, touching, tapping, selecting a user interface button on a screen, typing, an audio input, a gesture input, or the like). In the example shown in FIG. 4A, the user may tap the enable button 401 in FIG. 4A to enable the device discovery function, and select, by using the device discovery mode selection box 403, an AP mode or a station (station) mode of the mobile phone 310. In this embodiment, an "AP" mode is selected in the device discovery mode selection box 403, so that when the mobile phone 310 communicates with a smart device 330 through a Wi-Fi protocol subsequently, the mobile phone 310 is used as an AP, and the smart device 330 is used as a station.

S2: After receiving an instruction for enabling device discovery, the device discovery APP 311 sends a signal to a Wi-Fi unit 312 of the mobile phone 310, to enable a Wi-Fi hotspot (no password required) of the mobile phone 310.

S3: After receiving the instruction, the Wi-Fi unit 312 of the mobile phone 310 enables the Wi-Fi hotspot, and periodically sends a beacon broadcast frame to broadcast Wi-Fi hotspot information (for example, a service set identifier (Service Set Identifier, SSID)) of the mobile phone 310, so that the smart device 330 discovers and connects to a Wi-Fi network created by the mobile phone 310.

Figure 4B:
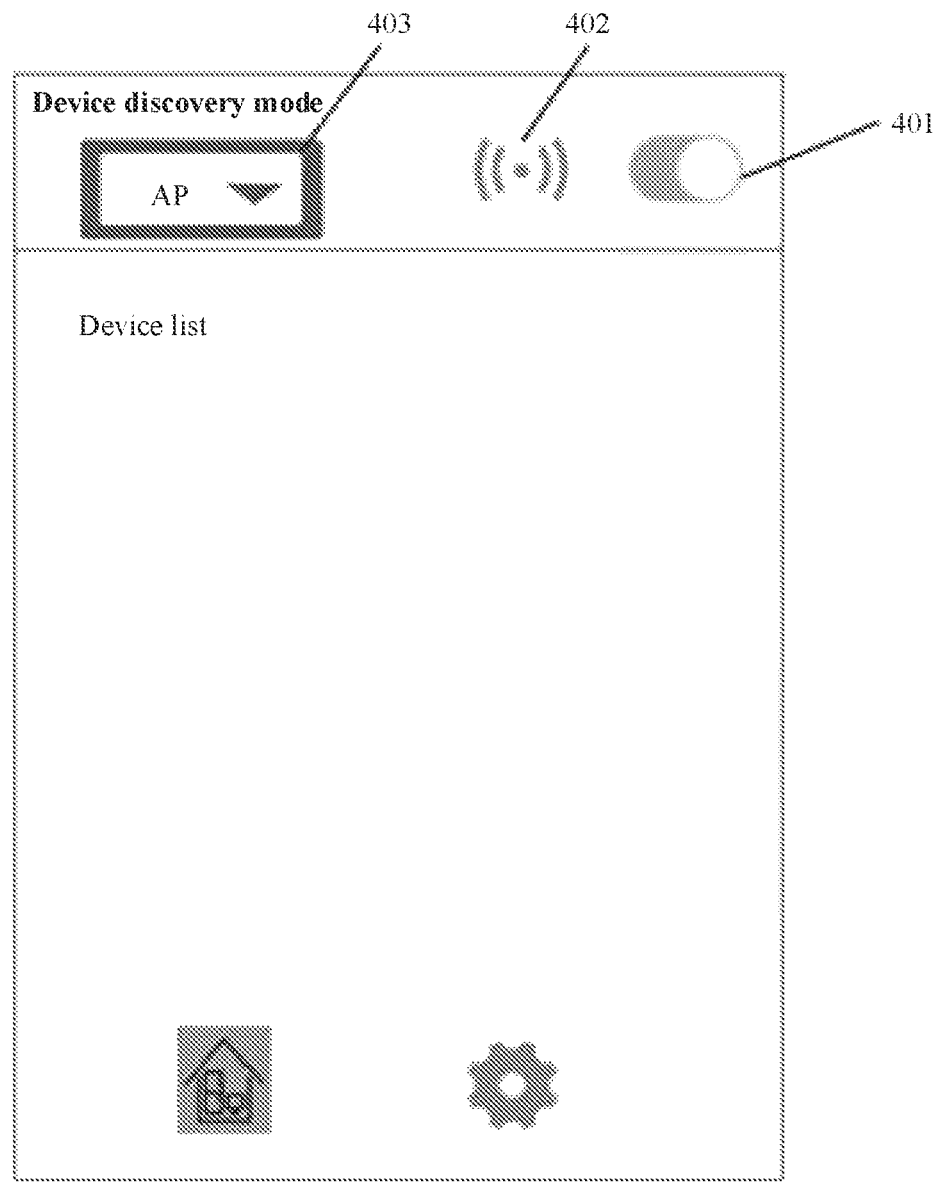
FIG. 4B shows an example of a UI of a device discovery APP in a case in which the device discovery APP receives an enable instruction and an "AP" mode is selected according to an embodiment of this application.

FIG. 4B shows an example of a UI of the device discovery APP 311 in a case in which the device discovery APP 311 receives an enable instruction and the "AP" mode is selected.

In the example, the user selects the "AP" mode in the device discovery mode selection box 403, and taps the enable button 401 of the mobile phone, so that the enable button 401 switches from a first state shown in FIG. 4A to a second state shown in FIG. 4B. A Wi-Fi hotspot of the mobile phone is enabled, and the signal identifier 402 in the UI may be changed from a disabled state shown in FIG. 4A into an enabled state shown in FIG. 4B, that is, from a state with a disabled identifier (for example, θ in FIG. 4A) into a state without the disabled identifier shown in FIG. 4B. In some other embodiments, the signal identifier 402 may indicate the disabled state and the enabled state of a Wi-Fi hotspot in another manner. For example, being gray indicates that a Wi-Fi hotspot is not enabled, and being colored indicates that a Wi-Fi hotspot is enabled.

S4: The smart device 330 enters a network configuration mode. A manner in which the smart device 330 enters the network configuration mode may be flexibly set by a manufacturer that provides the smart device 330. For example, the manner may be set as follows: The smart device 330 enters the network configuration mode when being powered on for the first time, or the device enters the network configuration mode when a user resets the smart device 300 (for example, by pressing and holding a physical button on the device). After entering the network configuration mode, the smart device 330 works as a station (station). It may be understood that, in embodiments of this application, a sequence of performing the operation of S4 on the smart device 330 side and performing the operations of S1 to S3 on the mobile phone 310 side is not limited.

S5: After entering the network configuration mode as the station, the smart device 330 sends a probe request (Probe Request) message. According to some embodiments of this application, an extension field in the probe request message may carry the following information: a waiting-for-network-configuration mark, a device ID, a device manufacturer ID, a name, a device type, a package name of a device management APP, a cloud service address of the device, a signature field generated by the device, and/or the like. The foregoing information does not need to be completely included in the probe request message. In different embodiments, some of the information may be carried in the probe request message based on various conditions such as a storage capacity of the smart device 330. For example, in some embodiments, only the device ID and the cloud service address of the device may be carried. FIG. 11 shows an example of the extension field.

S6: After receiving the probe request message sent by the smart device 330, the mobile phone 310 caches information of the smart device 330, and sends a probe response (Probe Response) message to the smart device 330. For example, as shown in FIG. 12, the probe response message may carry information indicating that network configuration is supported.

S7: Because the Wi-Fi hotspot that does not require a password is enabled on the mobile phone 310, the smart device 330 may directly send an association request (association request) message to the mobile phone 310 while identity authentication is not required, to request to connect to the Wi-Fi network.

S8: The mobile phone 310 responds to the association request of the smart device 330.

After operations of S5 to S8 are performed, authentication interaction of a Wi-Fi connection ends, the smart device 330 establishes a communication connection to the mobile phone 310, and then can normally perform data exchange.

According to some embodiments of this application, in a process of establishing a Wi-Fi communication connection, the smart device 330 may receive a plurality of probe response messages. In this case, the smart device 330 may preferentially connect to a newly-created Wi-Fi hotspot that carries information indicating that network configuration is supported.

S9 and S10: After the device discovery APP 311 detects, by listening, that the smart device 330 has established a communication connection to the Wi-Fi hotspot of the mobile phone 310, the device discovery APP 311 may access a cloud server 320 of the smart device 330 based on the cloud service address that is of the smart device 330 and that is obtained in the Wi-Fi connection process, to obtain network configuration information required for network configuration of the smart device 330.

For example, the device discovery APP 311 may send a network configuration information obtaining request to the cloud server 320 by using a mobile communications function of the mobile phone 310, to request to obtain network configuration information required by the smart device 330 to connect to a home Wi-Fi hotspot 340. The cloud server 320 sends the network configuration information to the mobile phone 310 in response to the received network configuration information obtaining request sent by the mobile phone 310. According to some embodiments of this application, the network configuration information may include but is not limited to: a device ID, a device MAC address, a device manufacturer ID, a device manufacturer name, a device type, information of a device management APP provided by a device manufacturer, a signature field generated by the device, and/or the like. A reason for accessing the cloud server 320 is mainly in consideration that the device side generally cannot store too much information. Therefore, a service on the cloud side may be accessed. When a storage capacity on the device side is large enough, related network configuration information may alternatively be directly obtained from the smart device 330.

S11: After obtaining the related network configuration information of the smart device 330, the device discovery APP 311 checks, based on the obtained information of the device management APP, whether a device management APP 313 provided by the manufacturer of the smart device 330 is installed on the mobile phone 310.

S12: The device discovery APP 311 selectively displays, to the user based on the obtained related network configuration information of the smart device 330, some information related to the smart device 330, for example, the device name and the information of a device management APP provided by a device manufacturer, and prompts the user to perform processing. When detecting that the device management APP 313 is not installed on the mobile phone 310 in S11, the device discovery APP 311 may prompt the user to authorize the smart device 330 to connect to the network and install the device management APP 313 of the smart device 330. When detecting that the device management APP 313 has been installed on the mobile phone 310 in S11, the device discovery APP 311 may prompt the user to authorize the smart device 330 to connect to the network.

Figure 5A:
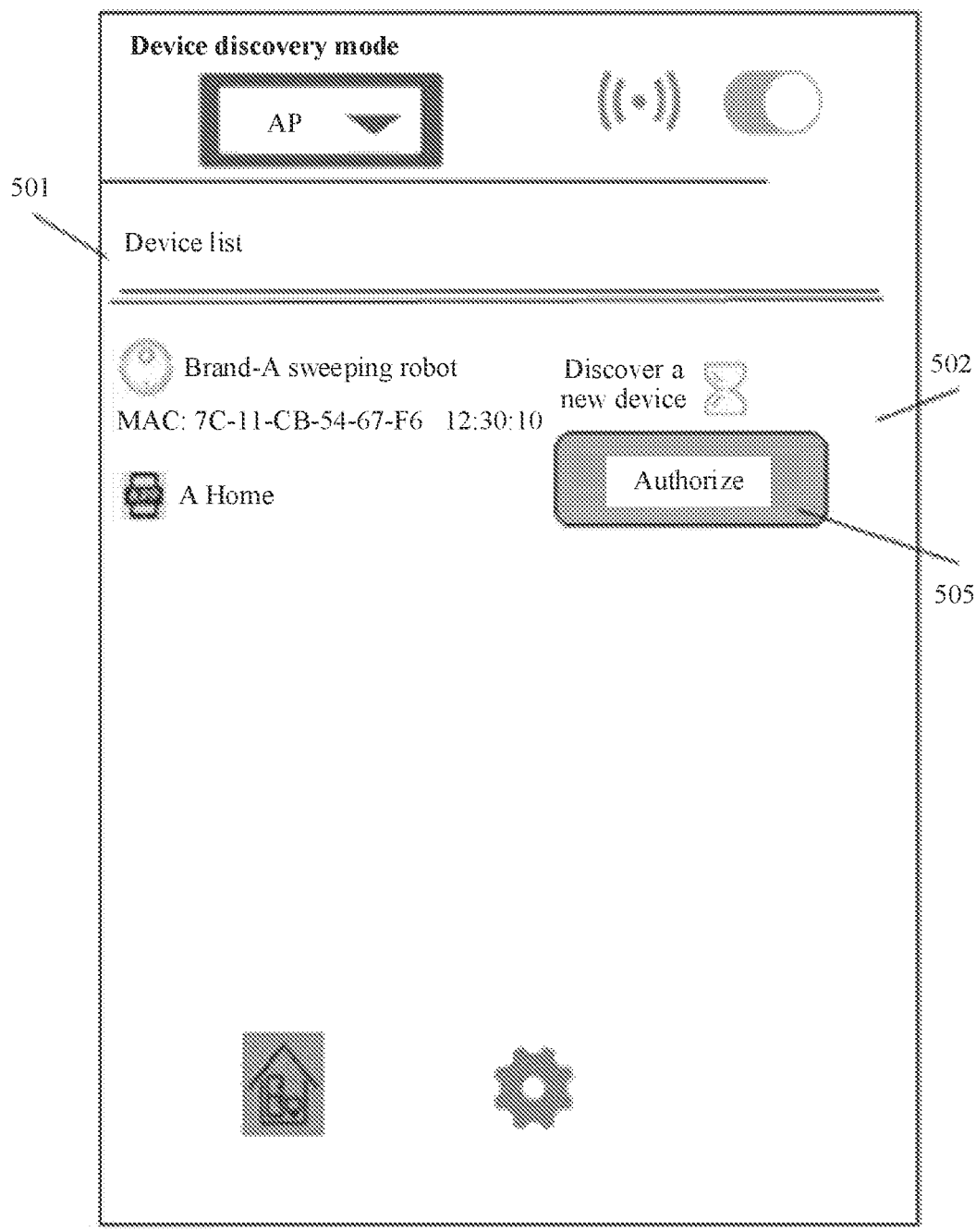
FIG. 5A shows an example of a UI of a device discovery APP in a case in which a mobile phone is used as an AP to connect to one smart device according to an embodiment of this application.
Figure 5B:
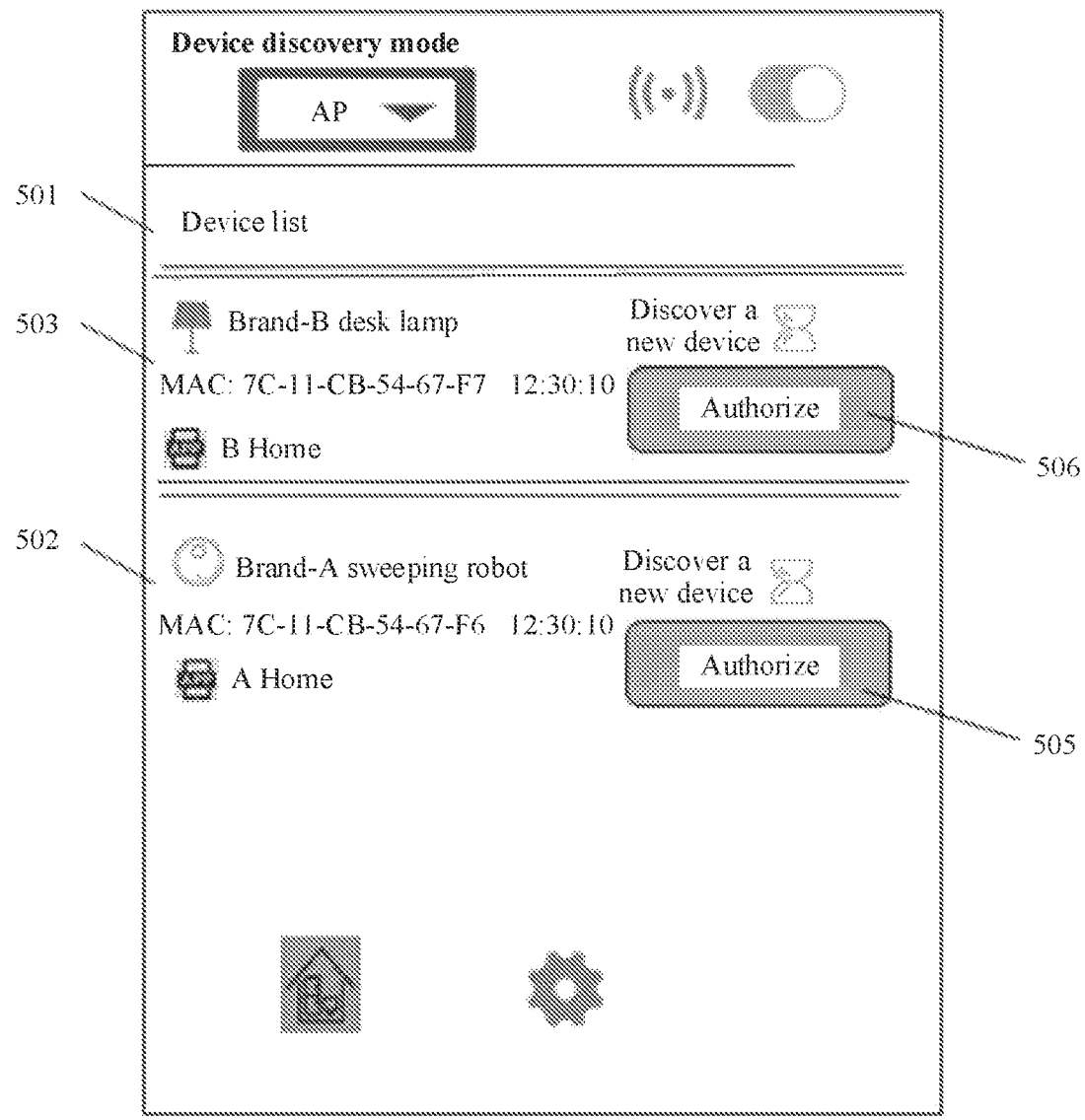
FIG. 5B shows an example of a UI of a device discovery APP in a case in which a mobile phone is used as an AP to connect to a plurality of smart devices according to an embodiment of this application.

In the current working mode, the mobile phone 310 is used as an AP, and the smart device 330 is used as a station. Therefore, one mobile phone 310 may be connected to a plurality of smart devices 330 at the same time. FIG. 5A and FIG. 5B respectively show a case in which the mobile phone 310 is connected to one device and a case in which the mobile phone 310 is connected to a plurality of smart devices.

FIG. 5A shows a case in which the mobile phone 310 is connected to one smart device 330, that is, a "brand-A sweeping robot", in an AP mode. As shown in FIG. 5A, a device list 501 may be displayed in a UI of the device discovery APP 311, and some information 502 about the brand-A sweeping robot is displayed in the device list. As shown in FIG. 5A, the some information 502 of the brand-A sweeping robot may include a device name "brand-A sweeping robot" of the brand-A sweeping robot, a MAC address "7C-11-CB-54-67-F6" of the brand-A sweeping robot, a time point "12:30:10" at which the brand-A sweeping robot establishes a connection to the mobile phone 310, a name "A Home" of a device management APP corresponding to the brand-A sweeping robot, and the like. The UI may further display an "Authorize" button 505, to prompt the user to authorize installation of the device management APP "A Home" on the left, authorize the corresponding device to connect to a network, and the like. The information 502 that is displayed in the example UI and that is related to the brand-A sweeping robot is merely an example for description. In different embodiments, the example UI may display different information. This is not limited in this application.

FIG. 5B shows a case in which the mobile phone 310 is connected to two smart devices 330 at the same time in an AP mode. As shown in FIG. 5B, the mobile phone 310 is connected to two smart devices, that is, a "brand-B desk lamp" and a "brand-A sweeping robot". A device list 501 may be displayed in a UI of the device discovery APP 311, and some information 502 of the "brand-A sweeping robot" and some information 503 of the "brand-B desk lamp" are displayed separately in the device list 501.

The some information 502 of the brand-A sweeping robot may include a device name "brand-A sweeping robot" of the brand-A sweeping robot, a MAC address "7C-11-CB-54-67-F6" of the brand-A sweeping robot, a time point "12:30:10" at which the brand-A sweeping robot establishes a connection to the mobile phone 310, a name "A Home" of a device management APP corresponding to the brand-A sweeping robot, and the like. The some information 503 of the brand-B desk lamp may include a device name "brand-B desk lamp" of the brand-B desk lamp, a MAC address "7C-11-CB-54-67-F7" of the brand-B desk lamp, a time point "12:30.10" at which the brand-B desk lamp establishes a connection to the mobile phone 310, a name "B Home" of a device management APP corresponding to the brand-B desk lamp, and the like. The UI may further separately display an "Authorize" button 505 of "A Home" and an "Authorize" button 506 of "B Home", to prompt the user to authorize installation of the device management APP "A Home" and/or the device management APP "B Home" on the left, authorize a corresponding device to connect to a network, and the like.

Figure 6:
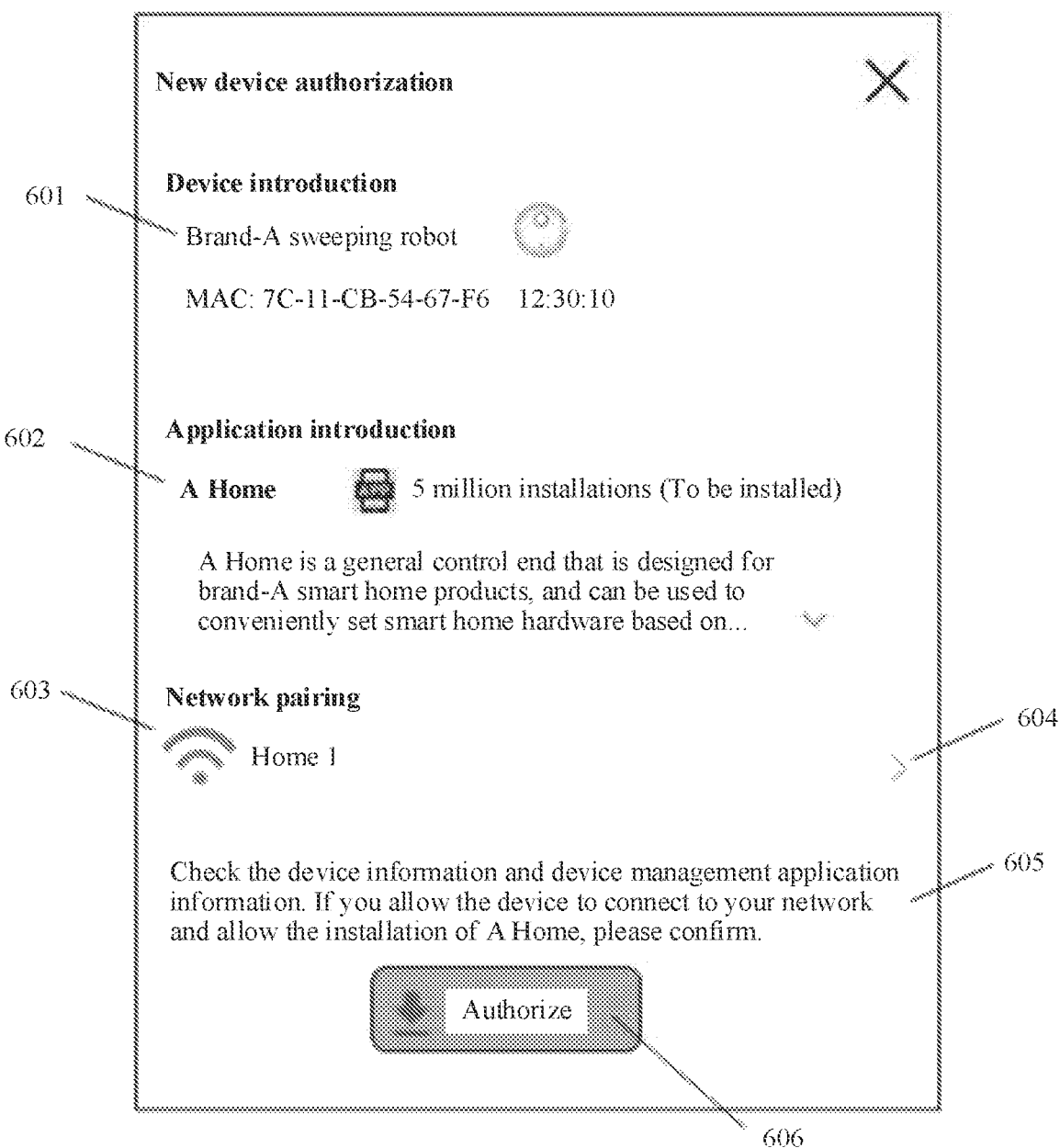
FIG. 6 shows an example of a UI of a device discover APP in which information is displayed to a user and the user is prompted for authorization.

After the user taps the "Authorize" button 505 corresponding to the "brand-A sweeping robot" in FIG. 5A or FIG. 5B, the UI of the device discovery APP 311 may jump to FIG. 6. According to some embodiments of this application, when the mobile phone 310 is connected to only one smart device 330, the UI shown in FIG. 5A may be skipped, and the UI shown in FIG. 6 is directly displayed.

FIG. 6 shows an example of a UI of the device discover APP 311 in which information is displayed to the user and the user is prompted for authorization when the device management APP 313 is not installed on the mobile phone 310. As shown in FIG. 6, the device discovery APP 311 may display more detailed information related to the smart device 330 to the user, and prompt the user to authorize the smart device 330 to connect to a network and install the device management APP 313 of the smart device 330. In the example shown in FIG. 6, the device discovery APP 311 displays, to the user, a name 601 "brand-A sweeping robot" of the smart device 330, a brief introduction 602 of the device management APP "A Home" corresponding to the "brand-A sweeping robot", a name 603 "home 1" of a wireless network to which the smart device 330 can connect, prompt information 605, and an "Authorize" button 606.

According to some embodiments of this application, the device discovery APP 311 may provide wireless network selection and switching options for the user, so that the user can select a Wi-Fi network (usually a home Wi-Fi network) to which the smart device 330 needs to connect for working. For example, the user may tap a selection identifier 604 in FIG. 6 to view names of all optional wireless networks, and select a wireless network to which the smart device 330 is to connect.

In addition, in a case in which the device management APP 313 has been installed on the mobile phone 310, because the device management APP 313 does not need to be installed again, the prompt information may no longer include prompt information for installing the device management APP 313. In the example, in a case in which the "A Home" APP has been installed on the mobile phone 310, the prompt information 605 may no longer include prompt information indicating that installation of the "A Home" APP is allowed.

S13: The device discovery APP receives an input of the user for authorization.

In the example in FIG. 6, after viewing related information, the user may perform authorization by clicking the "Authorize" button 606.

S14 and S15: After the user performs authorization, the device discovery APP 311 may verify a user identity, for example, may require the user to enter a lock screen password or enter a fingerprint, and determine whether user verification succeeds.

Figure 7:
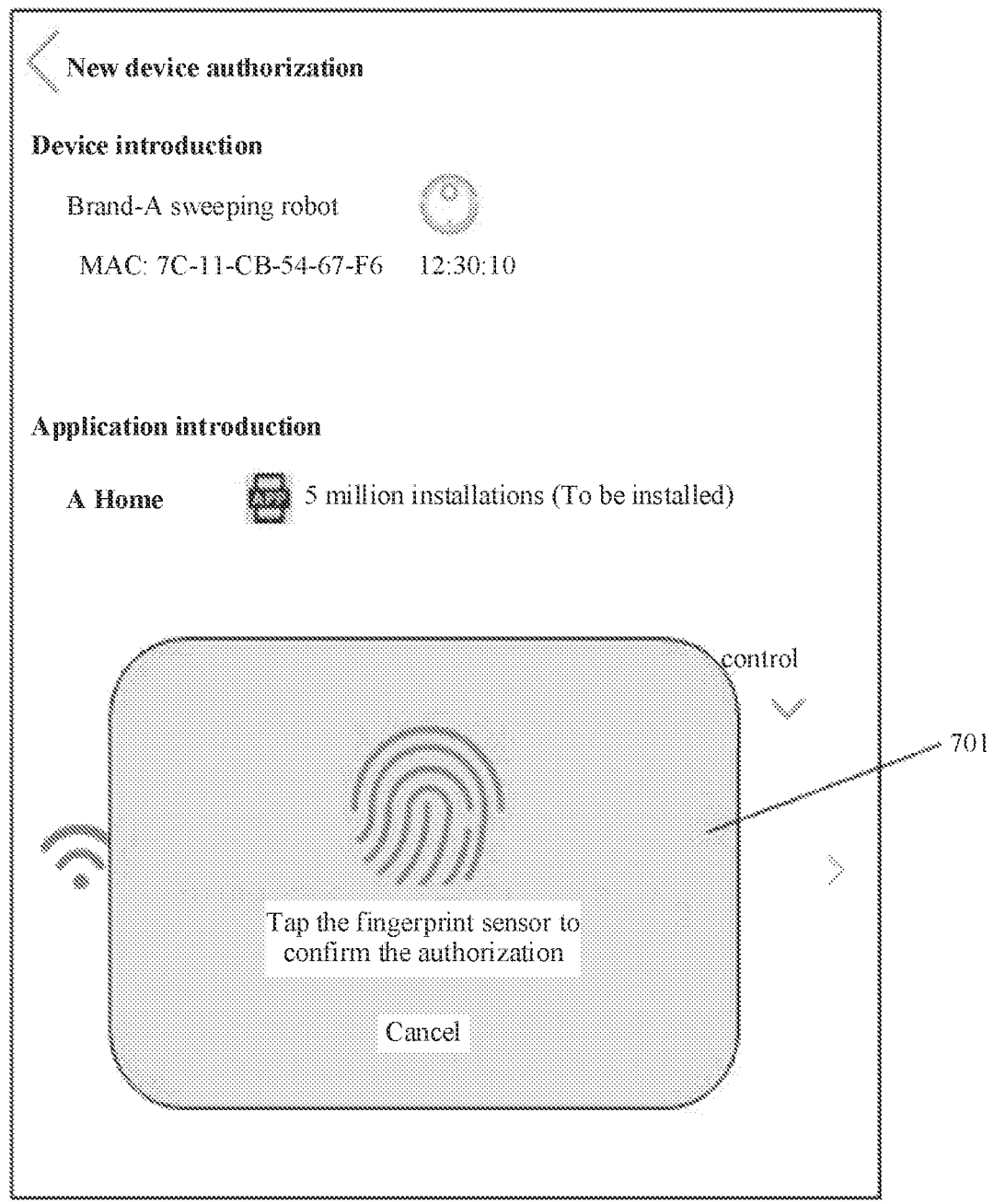
FIG. 7 shows an example of a UI in which a device discovery APP verifies a user identity by using a fingerprint according to an embodiment of this application.

FIG. 7 shows an example of a UI in which the device discovery APP 311 verifies the user identity by using a fingerprint. Based on the UI shown in FIG. 6, a verification area 701 is overlaid, and the user is prompted in the verification area 701 to enter a fingerprint to confirm authorization. The verification area 701 may be disposed in a fingerprint sensing area, and is used to collect the fingerprint of the user to confirm the user identity.

According to some embodiments of this application, the user identity may be verified in various manners, for example, by prompting, in a UI of the device discovery APP 311, the user to enter a lock screen password or to enter iris information by keeping an eye close to the mobile phone 310 an eye close to the mobile phone 310.

When the user verification fails, the device discovery APP 311 may prompt the user to re-enter a screen lock password or re-enter a fingerprint, or perform verification again in another verification manner. According to some embodiments of this application, during user identity verification, a maximum quantity of verification times may be set. If a quantity of verification times of a user exceeds a preset threshold of a quantity of verification times, a network configuration process may be interrupted or stopped.

In a case in which the user verification succeeds, S16 may be continuously performed: Downloading and installing the device management APP 313 starts, and the device discovery APP 311 automatically installs the device management APP 313 of the manufacturer in the background.

Figure 8A:
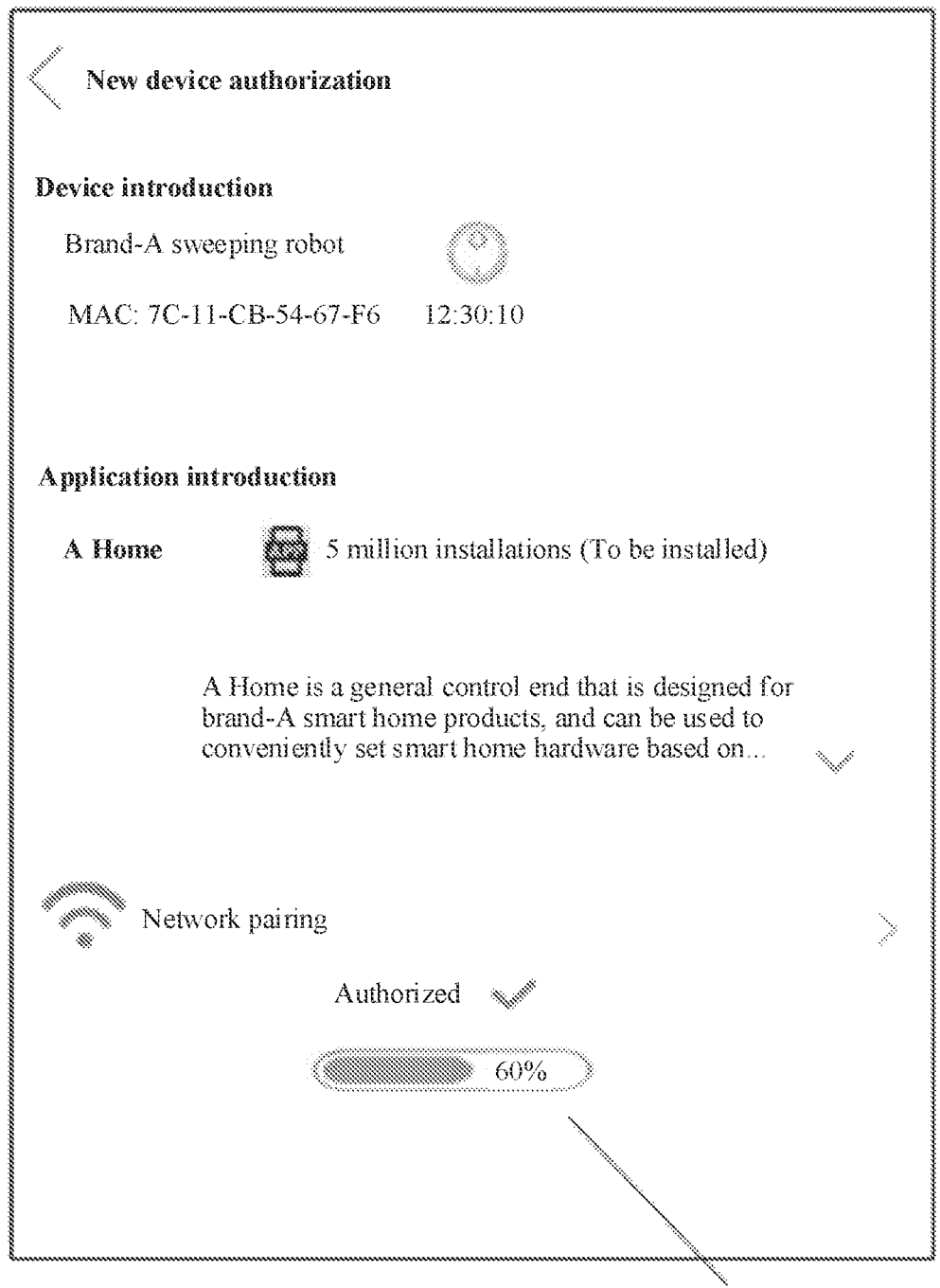
FIG. 8A shows an example of a UI in which a device discovery APP downloads a device management APP according to an embodiment of this application.
Figure 8B:
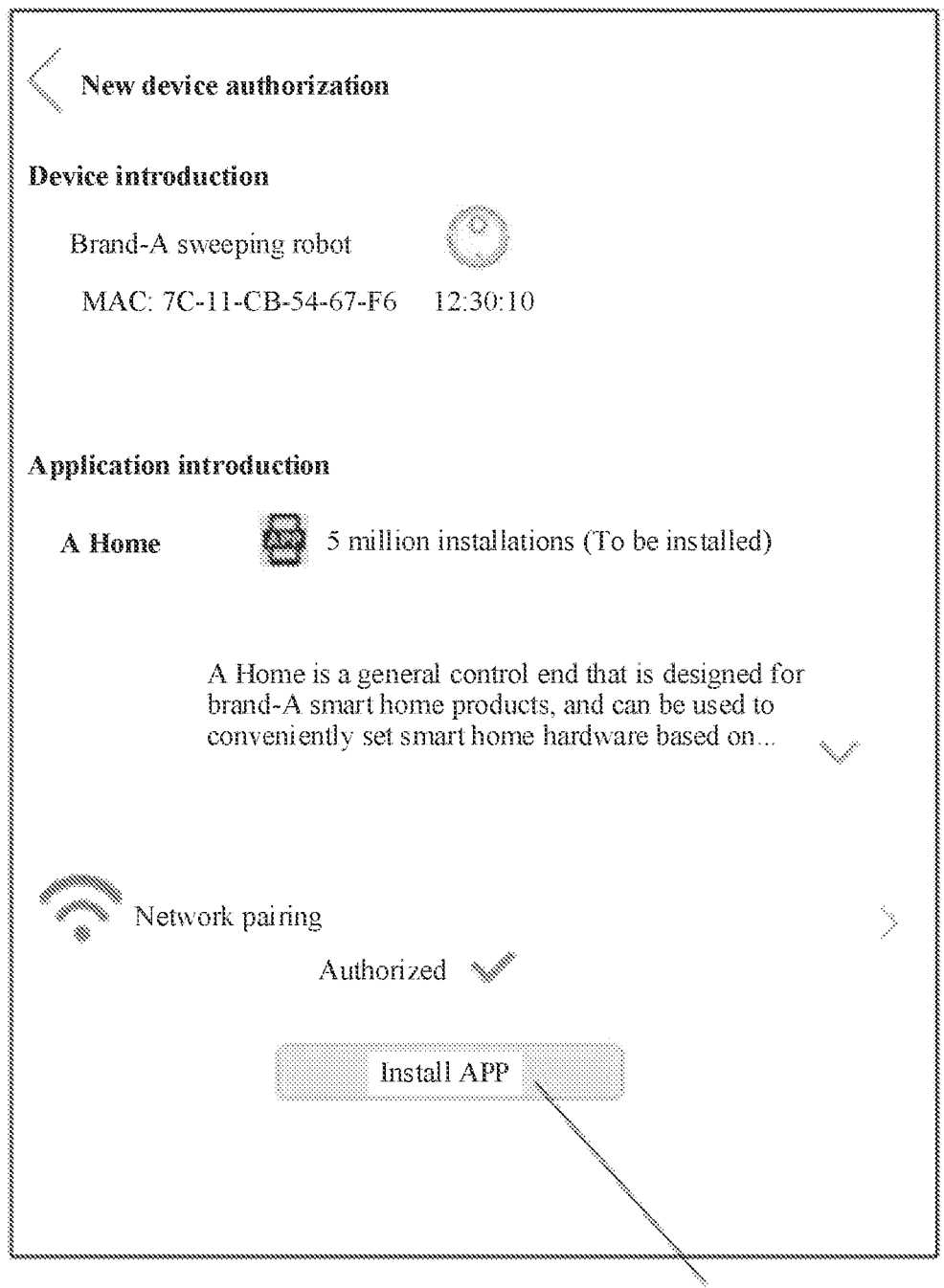
FIG. 8B shows an example of a UI in which a device discovery APP prompts a user to install a device management APP after the device management APP is downloaded according to an embodiment of this application.

FIG. 8A and FIG. 8B respectively show an example of a UI of the device discovery APP 311 in which the device discovery APP 311 downloads the device management APP and an example of a UI of the device discovery APP 311 in which the device discovery APP 311 prompts the user to install the device management APP. As shown in FIG. 8A, to enable the user to perceive a download progress, a download progress 801 of the device management APP 313 of the manufacturer may be displayed in the UI of the device discovery APP 311. After installation is completed, the download progress 801 may be changed into an "Install App" button 802, to prompt the user to install the App.

The operation of S16 is optional. According to some embodiments of this application, when the device management APP 313 provided by the device manufacturer has been installed on the mobile phone 310, this step may be directly skipped.

S17: After the device management APP 313 is installed, the device discovery APP 311 may prompt the user to open the device management APP 313, and notify the device management APP 313 that there is a device waiting for network configuration currently.

Figure 9:
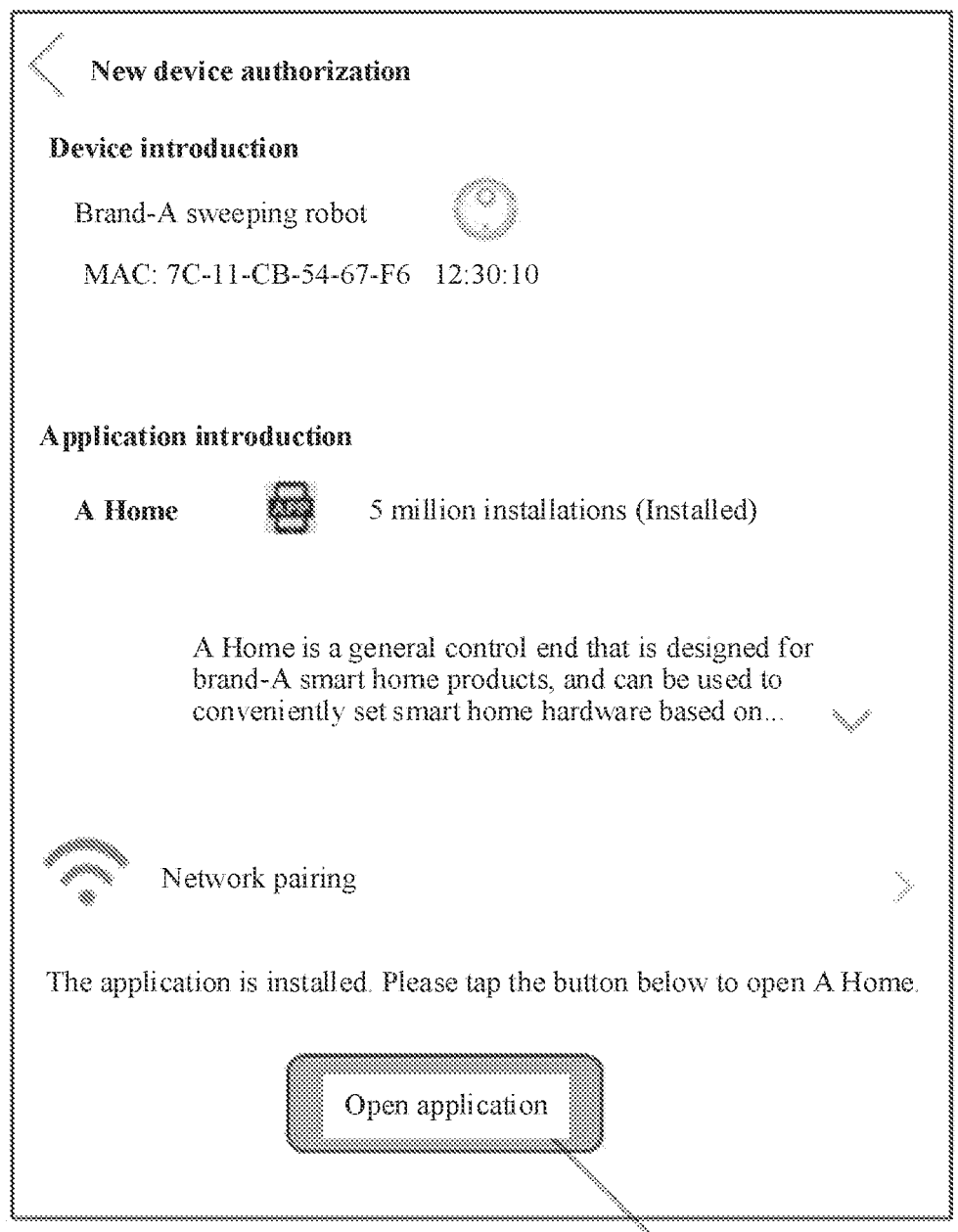
FIG. 9 shows an example of a UI in which a device discovery APP prompts a user to open a device management APP according to an embodiment of this application.

For example, after the device management APP 313 provided by the manufacturer is installed, the "Install App" button 802 in the UI of the device discovery APP 311 shown in FIG. 8B may be changed into an "Open App" button 901 shown in FIG. 9, so that the user can tap the "Open App" button 901 to open the device management APP 313.

S18: After the device management APP 313 is opened, the device management APP 313 may first guide the user to register or login in. The operation is optional, and whether registration or login is required may be determined by the device manufacturer.

S19: After the device management APP 313 is opened, the device management APP 313 may query network configuration authorization information from the device discovery APP 311. According to some embodiments of this application, the device discovery APP 311 may provide an application program interface (Application Program Interface, API) for the smart device 330 to query the network configuration authorization information. The device management APP 313 of the manufacturer queries, by invoking the API provided by the device discovery APP 311, whether there is a smart device waiting for network configuration, and when there is a smart device waiting for network configuration, invokes network configuration authorization information of the smart device.

According to some embodiments of this application, the network configuration authorization information may include but is not limited to: an authorization ID, a device ID, a device MAC address, an IP of the device on current Wi-Fi, a signature field generated by the smart device 330, network information (for example, a service set identifier (Service Set Identifier, SSID) and a password of a wireless network) of a wireless network to which the smart device 330 is to connect, and the like. Some of the network configuration authorization information may come from the network configuration information obtained by the device discovery APP 311 from the cloud server 320 or the smart device 330, and some of the network configuration authorization information is generated and stored in the mobile phone 310. The device management APP 313 may need to integrate a software development kit (Software Development Kit, SDK) provided by the device discovery APP 311.

S20: In response to the query of the device management APP 313, the device discovery APP 311 sends, to the device management APP 313, device network configuration authorization information that can be accessed by the device management APP 313. Generally, the device management APP 313 can access only network configuration authorization information of a smart device 330 that belongs to a brand of the device management APP 313.

S21: The device management APP 313 of the manufacturer may verify the network configuration authorization information. This operation is also an optional operation, and may be designed and determined by the device manufacturer. The device management APP 313 may perform verification based on a field generated during network configuration of the device and corresponding signature information.

S22: After the verification performed by the device management APP 313 on the related information succeeds, the device management APP 313 may communicate with the smart device 330 based on the Wi-Fi hotspot of the mobile phone 310, and notify the smart device 330 to switch a network. A network switching notification message is exchanged to the smart device 330 in a unicast manner. For example, the device management APP 313 may send the message to the smart device 330 in a UDP protocol unicast manner, a TCP protocol unicast manner, or the like. In this way, a password of the home Wi-Fi hotspot 340 does not need to be broadcast, thereby improving security of a network configuration process.

S23: After receiving the network switching notification sent by the device management APP 313, the smart device 330 returns a response to the device management APP 313.

S24 and S25: The smart device 330 disconnects from the Wi-Fi hotspot of the mobile phone based on the received network switching notification message, and connects to the home Wi-Fi hotspot 340 based on the SSID and the password that are of the to-be-connected wireless network (that is, the home Wi-Fi) and that are included in the received network switching notification message.

S26: After establishing a communication connection to the home Wi-Fi hotspot 340, the smart device 330 sends, to the cloud server 320 of the device, a message indicating that network configuration of the device succeeds.

S27: After receiving the message, the cloud server 320 of the smart device 330 may notify the device management APP 313 that network configuration of the smart device 330 succeeds.

S28: After receiving a message sent by the cloud server 320, the device management APP 313 sends a message to the device discovery APP 311, to notify the device discovery APP 311 that network configuration of the smart device 330 succeeds. In addition, the device management APP 313 may prompt the user that network configuration succeeds, for example, prompt the user by using a sound or a UI change.

S29: After receiving the message indicating that network configuration succeeds, the device discovery APP 311 may update the UI, to prompt the user that network configuration of the smart device 330 succeeds, or prompt the user that configuration of a next smart device can be continued, or the like.

Figure 10:
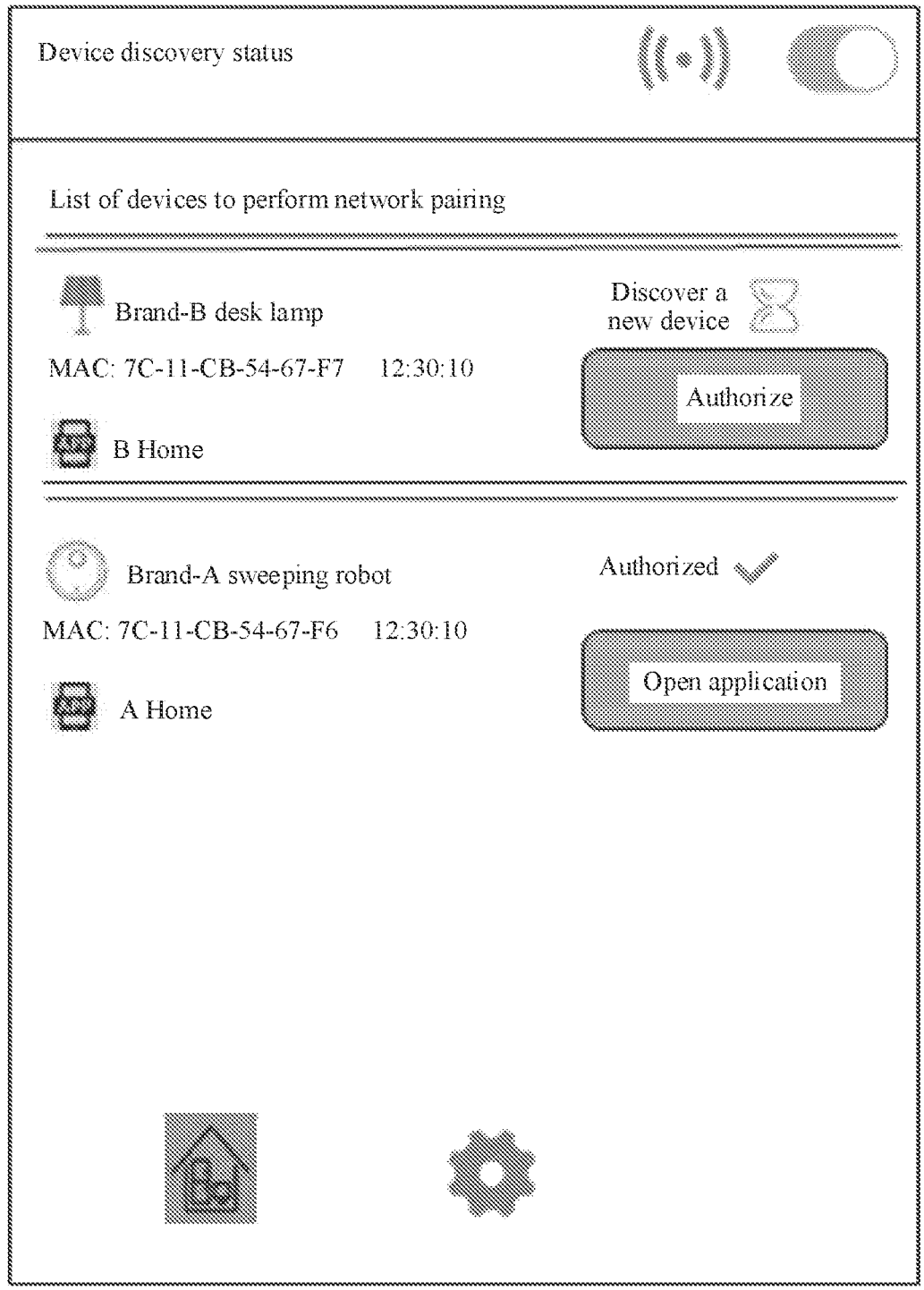
FIG. 10 shows a UI example in which after network configuration succeeds, a device discovery APP returns to a device list to prompt a user to continue to perform configuration of a next smart device according to an embodiment of this application.

For example, according to some embodiments of this application, in a case in which the mobile phone 310 shown in FIG. 5B needs to perform network configuration of a plurality of devices, after network configuration of the "brand-A sweeping robot" succeeds, a UI of the device discovery APP 311 may return to a device list, as shown in FIG. 10. In this way, the user can perform configuration of a next device "brand-B desk lamp".

S30: if the user does not perform a new action within a preset time period, the device discovery APP 311 can automatically disable the Wi-Fi hotspot of the mobile phone.

With reference to FIG. 3A to FIG. 3C, some embodiments of this application are provided above. In these embodiments of this application, the device discovery APP 311 is provided to guide the user to install the device management APP 313 provided by the manufacturer of the smart device 330, and the device network configuration assistance API is provided to be invoked by the device management APP 313 of the manufacturer, to assist the device management APP 313 of the manufacturer in completing the network configuration of the device. In addition, in these embodiments, an identity authentication capability of the mobile phone is used, for example, a fingerprint or a screen lock password is used to confirm a current user identity, thereby simplifying an operation of authorizing the smart device 330 to connect to the home Wi-Fi hotspot 340. When network configuration is performed in the foregoing manner, the smart device 330 can be discovered by the device discovery APP 311 provided that the smart device 330 marks device information of the smart device 330 in the Wi-Fi protocol. Therefore, the user is guided to install the device management APP 313 of the manufacturer, and the device management APP 313 of the manufacturer is used for network configuration, which is also compatible.

For a user, when performing network configuration of smart devices, the user does not need to search for and install each corresponding device management APP 313 for each smart device 330. Instead, the user can directly use a general APP such as the device discovery APP 311 to automatically search for and install each corresponding device management APP 313, thereby facilitating and simplifying a network configuration operation for the smart device.

In addition, according to some embodiments of this application, in a case in which the device management APP 313 of the manufacturer is installed on the mobile phone 310, if the user has performed authorization before, the user may directly open the device management APP 313 without performing an authorization operation before opening the device management APP 313. For example, a network configuration process is interrupted after the user installs the device management APP 313 of the manufacturer, and subsequently, the user opens the device management APP 311 again to continue to perform a network configuration operation. In this case, after some information related to the smart device 330, for example, the device name and the information that is of the device management APP and that is provided by the manufacturer, is displayed for the user in the operation of S12, the user may be directly prompted to open the APP. After an instruction for opening the APP that is input by the user is received, the authorization operations of S13 to S16 in FIG. 3B are skipped, S17 is directly performed to match and jump to the installed device management APP 313 of the device manufacturer.

With reference to FIG. 3A to FIG. 3C, some embodiments in which a smart device is in a station mode and a mobile phone is used as an AP are provided. However, for actual products, some smart devices support network configuration only in an AP mode. The following describes, with reference to FIG. 13A to FIG. 13C, an example of a network configuration process in which a smart device is used as an AP, and a mobile phone is used as a station to connect to a Wi-Fi hotspot of the smart device.

S50: A user opens a device discovery APP 1311 of a mobile phone 1310, and enables a device discovery function in the device discovery APP 1311.

An initial user interface of the device discovery APP 1311 may still be referred to that shown in FIG. 4A. The device discovery APP 1311 is in an initial state in which a mobile phone hotspot is not enabled. In the initial state, an indication indicating that the user enables the device discovery function may be received. According to some embodiments of this application, the user indication may be received in a form of selecting a user interface element (for example, touching, tapping, selecting a user interface button on a screen, typing, an audio input, a gesture input, or the like). In the example shown in FIG. 4A, the user may tap the enable button 401 in FIG. 4A to enable the device discovery function. In addition, the user selects a "station" mode in the device discovery mode selection box 403, so that when the mobile phone 1310 communicates with a smart device 1330 through a Wi-Fi protocol subsequently, the mobile phone 1310 is used as a station, and the smart device 1330 is used as an AP.

S51: After receiving an instruction for enabling device discovery, the device discovery APP 1311 sends a message to a Wi-Fi unit 1312 of the mobile phone 1310, to instruct the Wi-Fi unit 1312 of the mobile phone 1310 to start scanning a surrounding Wi-Fi signal.

Figure 4C:
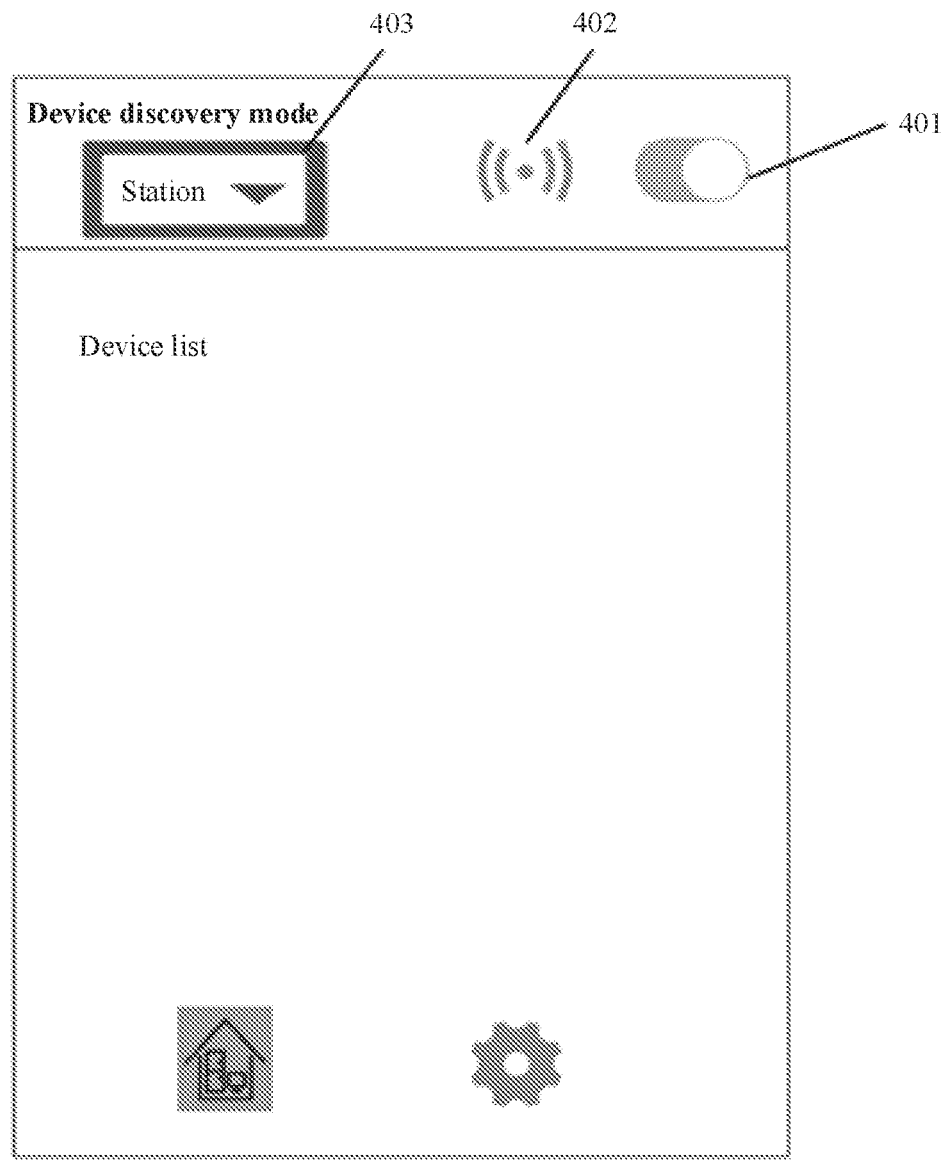
FIG. 4C shows an example of a UI of a device discovery APP in a case in which the device discovery APP receives an enable instruction and a "station" mode is selected according to an embodiment of this application.

FIG. 4C shows an example of a UI of the device discovery APP 1311 in a case in which the device discovery APP 1311 receives an enable instruction and the "station" mode is selected. In the example, the user selects the "station" mode in the device discovery mode selection box 403, and taps the enable button 401 of the mobile phone, so that the enable button 401 switches from a first state shown in FIG. 4A to a second state shown in FIG. 4C. The Wi-Fi unit 1312 of the mobile phone disconnects from an originally connected Wi-Fi hotspot, and starts to scan the surrounding Wi-Fi hotspot, and the signal identifier 402 in the UI may be changed from a disabled state shown in FIG. 4A into an enabled state shown in FIG. 4C, that is, from a state with a disabled identifier (for example, θ in FIG. 4A) into a state without the disabled identifier shown in FIG. 4C. In some other embodiments, the signal identifier 402 may indicate the disabled state and the enabled state in another manner. For example, being gray indicates the disabled state, and being colored indicates the enabled state.

S52: The smart device 1330 enters a network configuration mode. A manner in which the smart device 1330 enters the network configuration mode may also be flexibly set by a manufacturer that provides the smart device 1330. For example, the manner may be set as follows: The smart device 1330 enters the network configuration mode when being powered on for the first time, or the device enters the network configuration mode when a user resets the smart device 300 (for example, by pressing and holding a physical button on the device). After entering the network configuration mode, the smart device 1330 works as the AP.

S53: After entering the network configuration state as the AP, the smart device 1330 enables a Wi-Fi hotspot, and periodically sends a beacon broadcast frame, to broadcast Wi-Fi hotspot information (for example, an SSID) of the smart device 1330, so that the mobile phone 1310 discovers and connects to a Wi-Fi network established by the smart device 1330.

It may be understood that, in embodiment of this application, a sequence of performing operations of S53 and S54 on the smart device 1330 side and performing the operations of S51 and S52 on the mobile phone 1310 side is not limited.

S54: If the mobile phone 1310 is currently connected to another Wi-Fi hotspot, the Wi-Fi unit 1312 of the mobile phone 1310 needs to first disconnect from the currently connected Wi-Fi hotspot, and then send a probe request (Probe Request) to scan the surrounding Wi-Fi signal. According to some embodiments of this application, the probe request message sent by the mobile phone 1310 may carry information indicating that network configuration is supported. According to some other embodiments of this application, the probe request message may alternatively not carry information indicating that network configuration is supported.

S55: After receiving the probe request message sent by the mobile phone 1310, the smart device 1330 sends a probe response (Probe Response) message to the mobile phone 1310. According to some embodiments of this application, an extension field in the probe response message may carry the following information: a waiting-for-network-configuration mark, a device ID, a device manufacturer ID, a name, a device type, a package name of a device management APP, a cloud service address of the device, a signature field generated by the device, and/or the like. The foregoing information does not need to be completely included in the probe response message. In different embodiments, some of the information may be carried in the probe response message based on various conditions such as a storage capacity of the smart device 1330. For example, in some embodiments, only the device ID and the cloud service address of the device may be carried.

S56: A Wi-Fi hotspot with a waiting-for-network-configuration mark may be listed in a UI of the device discovery APP 1311 for the user to select. In the current working mode, the mobile phone 1310 is used as a station, and the smart device 1330 is used as an AP. Therefore, one mobile phone 1310 can be connected to only one smart device 1330.

Figure 5C:
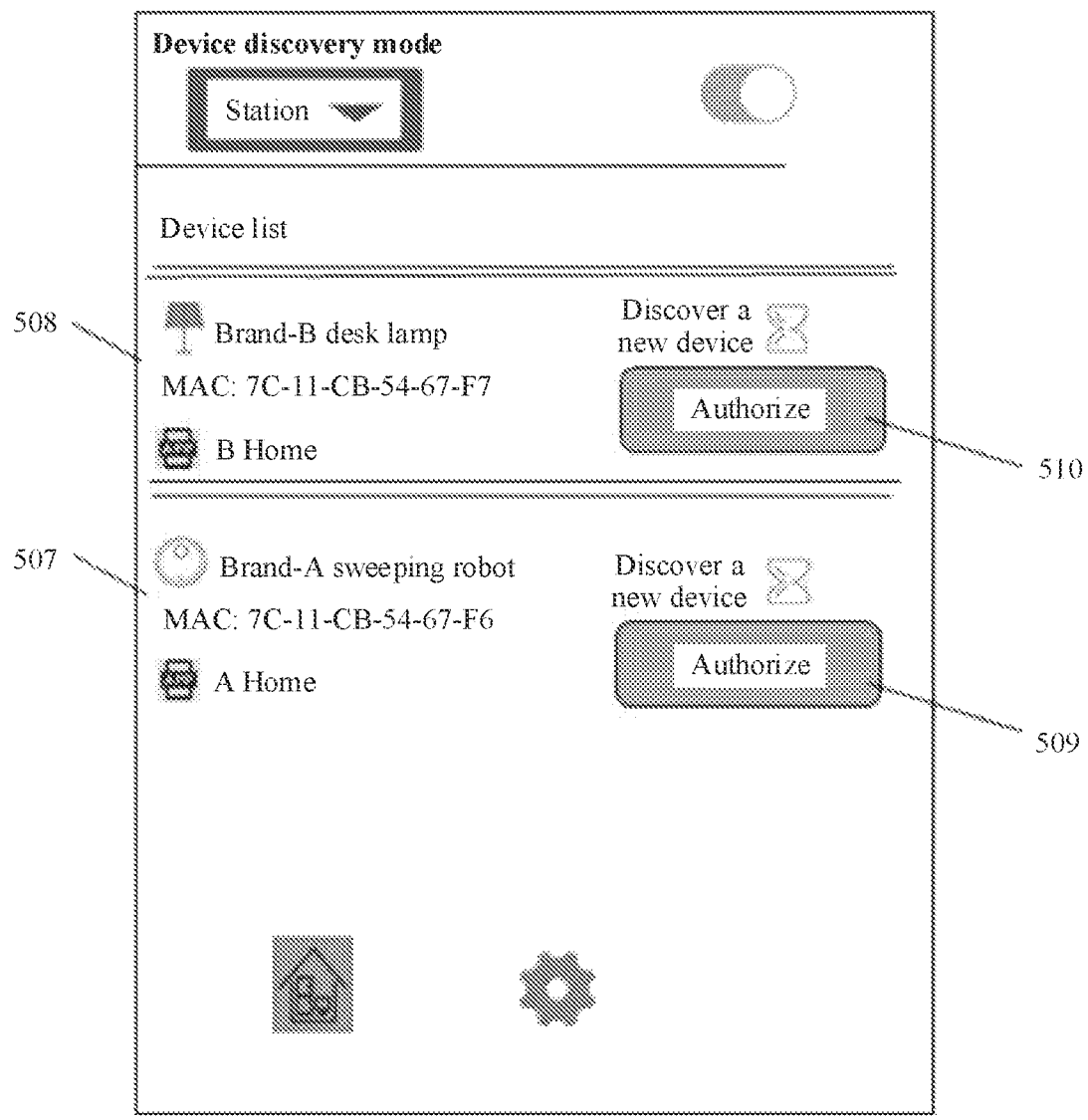
FIG. 5C shows an example in which a mobile phone is used as a station, and a plurality of smart devices are shown in a UI of a device discovery APP for a user to select according to an embodiment of this application.

For example, as shown in FIG. 5C, in a mode in which the mobile phone 1310 is used as a station, a device list may be displayed in a UI of the device discovery APP 1311, and Wi-Fi information of one or more smart devices 1330 is displayed in the device list. In the example in FIG. 5C, SSIDs of two smart devices 1330 are listed in the device list in the UI of the device discovery APP 1311: a "brand-A sweeping robot" and a "brand-B desk lamp", and some information 507 of the "brand-A sweeping robot" and some information 508 of the "brand-B desk lamp" are displayed separately.

The some information 507 of the brand-A sweeping robot may include an SSID "brand-A sweeping robot" of the brand-A sweeping robot, a MAC address "7C-11-CB-54-67-F6" of the brand-A sweeping robot, a name "A Home" of a device management APP corresponding to the brand-A sweeping robot, and the like. The some information 508 of the brand-B desk lamp may include an SSID "brand-B desk lamp" of the brand-B desk lamp, a MAC address "7C-11-CB-54-67-F7" of the brand-B desk lamp, a name "B Home" of a device management APP corresponding to the brand-B desk lamp, and the like. The UI may further separately display an "Authorize" button 509 of "A Home" and an "Authorize" button 510 of "B Home", to prompt the user to authorize installation of the device management APP "A Home" and/or the device management APP "B Home" on the left, authorize a corresponding device to connect to a network, and the like.

In this case, the mobile phone 1310 does not establish a communication connection to any smart device 1330, and the user may tap the "Authorize" button 509 to select one of two Wi-Fi hotspots to perform an operation.

Figure 5D:
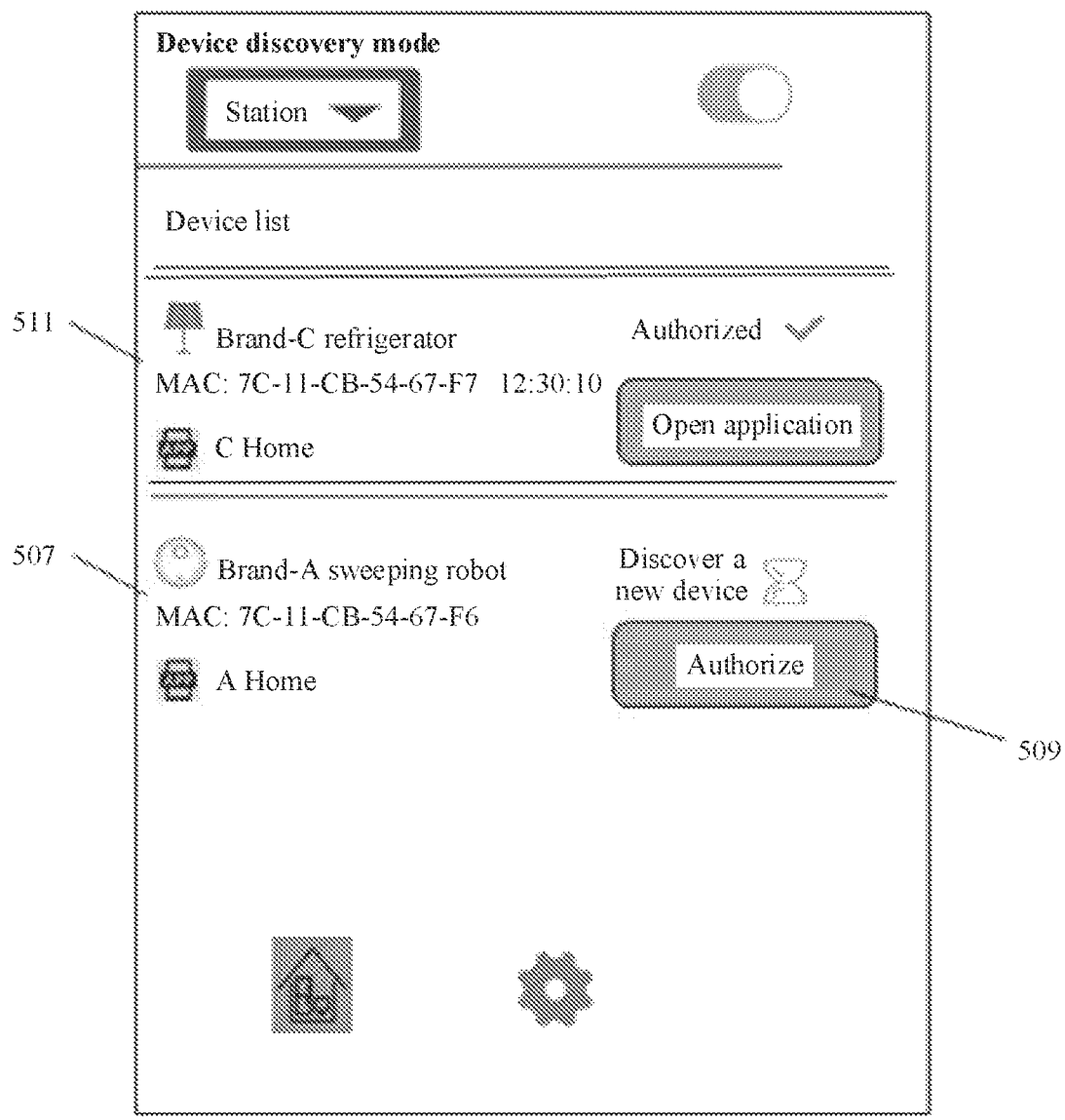
FIG. 5D shows an example in which a mobile phone is used as a station, and a smart device that has been configured and a newly-discovered smart device are shown in a UI of a device discovery APP according to an embodiment of this application.

Certainly, in some cases, the device discovery APP 1311 may have performed configuration of another smart device, and a smart device that has been configured may also be displayed in the device list. For example, as shown in FIG. 5D, some information 511 of a smart device "brand-C refrigerator" that has been configured before and the some information 507 that is of a Wi-Fi hotspot "brand-A sweeping robot" with a waiting-for-network-configuration mark that is newly scanned by the mobile phone 1310 are separately displayed in the device list 501.

S57 and S58: The device discovery APP 1311 detects that the waiting-for-network-configuration mark exists in the received probe response message the received probe response message, and the device discovery APP 1311 may access a cloud server 1320 of the smart device 1330 based on the cloud service address of the smart device 1330 in the probe response message, to obtain network configuration information required for network configuration of the smart device 1330. To be specific, the device discovery APP 1311 may send a network configuration information obtaining request to the cloud server 1320 by using a mobile communications function of the mobile phone 1310, to request to obtain network configuration information required by the smart device 1330 to connect to a home Wi-Fi hotspot 1340. The cloud server 1320 sends the network configuration information to the mobile phone 1310 in response to the received network configuration information obtaining request sent by the mobile phone 1310. According to some embodiments of this application, the network configuration information may include but is not limited to: a device ID, a device MAC address, a device manufacturer ID, a device manufacturer, a device type, information of a device management APP provided by the device manufacturer, a signature field generated by the device, and/or the like. A reason for accessing the cloud server 1320 is mainly in consideration that the device side generally cannot store too much information. Therefore, a service on the cloud side may be accessed. When a storage capacity on the device side is large enough, related network configuration information may alternatively be directly obtained from the smart device 1330. According to some embodiments of this application, operations of the two steps S57 and S58 may be performed before the operation of S56 or may be performed in parallel with the operation of S56.

S59: After obtaining the related network configuration information of the smart device 1330, the device discovery APP 1311 checks, based on the obtained information of the device management APP, whether a device management APP 1313 provided by the manufacturer of the smart device 1330 is installed on the mobile phone 1310.

S60: The device discovery APP 1311 selectively displays, to the user based on the obtained related network configuration information of the smart device 1330, some information related to the smart device 1330, for example, the device name and the information of a device management APP provided by a device manufacturer, and prompts the user to perform processing. When detecting that the device management APP 1313 is not installed on the mobile phone 1310 in S59, the device discovery APP 1311 may prompt the user to authorize the smart device 1330 to connect to the network and install the device management APP 1313 of the smart device 1330. When detecting that the device management APP 1313 has been installed on the mobile phone 1310 in S59, the device discovery APP 1311 may prompt the user to authorize the smart device 1330 to connect to the network.

After the user taps the "Authorize" button 509 corresponding to the "brand-A sweeping robot" in FIG. 5C or FIG. 5D, the UI of the device discovery APP 1311 may jump to FIG. 6.

FIG. 6 shows an example of a UI that is used when the device management APP 1313 is not installed on the mobile phone 1310. As shown in FIG. 6, the device discovery APP 1311 may display detailed information related to the smart device 1330 to the user, and prompt the user to authorize the smart device 1330 to connect to a network and install the device management APP 1313 of the smart device 1330. In the example shown in FIG. 6, the device discovery APP 1311 displays, to the user, a name 601 "brand-A sweeping robot" of the smart device 1330, a brief introduction 602 of the device management APP "A Home" corresponding to the "brand-A sweeping robot", a name 603 "home 1" of a wireless network to which the smart device 1330 can connect, prompt information 605, and an "Authorize" button 606.

According to some embodiments of this application, the device discovery APP 1311 may provide wireless network selection and switching options for the user, so that the user can select a Wi-Fi network (usually a home Wi-Fi network) to which the smart device 1330 needs to connect for working. For example, the user may tap a selection identifier 604 in FIG. 6 to view names of all optional wireless networks, and select a wireless network to which the smart device 1330 is to connect.

In addition, in a case in which the device management APP 1313 has been installed on the mobile phone 1310, because the device management APP 1313 does not need to be installed again, the prompt information may no longer include prompt information for installing the device management APP 1313. In the example, in a case in which the "A Home" APP has been installed on the mobile phone 1310, the prompt information 605 may no longer include prompt information indicating that installation of the "A Home" APP is allowed.

S61: The device discovery APP receives an input of the user for authorization.

n the example in FIG. 6, after viewing related information, the user may perform authorization by clicking the "Authorize" button 606.

S62 and S63: After the user performs authorization, the device discovery APP 1311 may verify a user identity, for example, may require the user to enter a lock screen password or enter a fingerprint, and determine whether user verification succeeds.

FIG. 7 shows an example of a UI in which the device discovery APP 1311 verifies the user identity by using a fingerprint. Based on the UI shown in FIG. 6, a verification area 701 is overlaid, and the user is prompted in the verification area 701 to enter a fingerprint to confirm authorization. The verification area 701 may be disposed in a fingerprint sensing area, and is used to collect the fingerprint of the user to confirm the user identity.

According to some embodiments of this application, the user identity may be verified in various manners, for example, by prompting, in a UI of the device discovery APP 1311, the user to enter a lock screen password or to enter iris information by keeping an eye close to the mobile phone 1310 eye close to the mobile phone 1310.

When the user verification fails, the device discovery APP 1311 may prompt the user to re-enter a screen lock password or re-enter a fingerprint, or perform verification again in another verification manner. According to some embodiments of this application, during user identity verification, a maximum quantity of verification times may be set. If a quantity of verification times of a user exceeds a preset threshold of a quantity of verification times, a network configuration process may be interrupted or stopped.

In a case in which the user verification succeeds, S64 may be continuously performed: Installing the device management APP 1313 starts, and the device discovery APP 1311 installs the device management APP 1313 of the manufacturer in the background. An example of a UI of the device discovery APP 1311 in which the device discovery APP 1311 downloads the device management APP and an example of a UI of the device discovery APP 1311 in which the device discovery APP 1311 prompts the user to install the device management APP may still be referred to FIG. 8A and FIG. 8B. To enable the user to perceive a download progress, a download progress 801 of the device management APP 1313 of the manufacturer may be displayed in the UI of the device discovery APP 1311. After installation is completed, the download progress 801 may be changed into an "Install App" button 802, to prompt the user to install the App.

The operation of S64 is optional. According to some embodiments of this application, when the device management APP 1313 provided by the device manufacturer has been installed on the mobile phone 1310, this step may be directly skipped.

S65: After the device management APP 1313 is installed, the device discovery APP 1311 may prompt the user to open the device management APP 1313, and notify the device management APP 1313 that there is a device waiting for network configuration currently.

For example, after the device management APP 1313 provided by the manufacturer is installed, the "Install App" button 802 in the UI of the device discovery APP 1311 shown in FIG. 8B may be changed into an "Open App" button 901 shown in FIG. 9, so that the user can tap the "Open App" button 901 to open the device management APP 1313.

S66: After the device management APP 1313 is opened, the device management APP 1313 may first guide the user to register or login in. The operation is optional, and whether registration or login is required may be determined by the device manufacturer.

S67: After the device management APP 1313 is opened, the device management APP 1313 may query network configuration authorization information from the device discovery APP 1311. According to some embodiments of this application, the device discovery APP 1311 may provide an application program interface (Application Program Interface, API) for the smart device 1330 to query the network configuration authorization information. The device management APP 1313 of the manufacturer queries, by invoking the API provided by the device discovery APP 1311, whether there is a smart device waiting for network configuration, and when there is a smart device waiting for network configuration, invokes network configuration authorization information of the smart device. According to some embodiments of this application, the network configuration authorization information may include but is not limited to: an authorization ID, a device ID, a device MAC address, an IP of the device on current Wi-Fi, a signature field generated by the smart device 1330, network information (for example, an SSID and a password of a wireless network) of a wireless network to which the smart device 1330 is to connect, and the like. Some of the network configuration authorization information may come from the network configuration information obtained by the device discovery APP 1311 from the cloud server 1320 or the smart device 1330, and some of the network configuration authorization information is generated and stored in the mobile phone 1310. The device management APP 1313 may need to integrate a software development kit (Software Development Kit, SDK) provided by the device discovery APP 1311.

S68: In response to the query of the device management APP 1313, the device discovery APP 1311 sends, to the device management APP 1313, device network configuration authorization information that can be accessed by the device management APP 1313. Generally, the device management APP 1313 can access only network configuration authorization information of a smart device 1330 that belongs to a brand of the device management APP 1313.

S69: The device management APP 1313 of the manufacturer may verify the network configuration authorization information. This operation is also an optional operation, and may be designed and determined by the device manufacturer. The device management APP 1313 may perform verification based on a field generated during network configuration of the device and corresponding signature information.

S70: After the verification performed by the device management APP 1313 on the related information succeeds, the device discovery APP 1311 sends an association request (association request) message to the smart device 1330 to request to connect to a Wi-Fi hotspot of the smart device 1330.

S71: The smart device 1330 responds to the association request of the mobile phone 1310.

After the operations of S70 and S71 are performed, interaction of a Wi-Fi connection ends, and the smart device 1330 establishes a communication connection to the mobile phone 1310.

In embodiments described with reference to FIG. 13A to FIG. 13C, after the mobile phone 1310 and the smart device 1330 discover each other, the mobile phone 1310 does not immediately connect to the Wi-Fi hotspot of the smart device 1330, but first performs operations such as the authorization and the verification, and then connects to the Wi-Fi hotspot of the smart device 1330 after the device management APP 1313 is downloaded. A reason is that when the device discovery APP 1311 guides installation of the device management APP 1313 corresponding to the smart device 1330, a Wi-Fi network for daily work of the mobile phone 1310 or a mobile network provided by an operator needs to be used, but the Wi-Fi network established by the smart device 1330 is not used (currently, the Wi-Fi network established by the smart device 1330 cannot access the Internet). The device management APP 1313 is first downloaded and then the smart device 1330 establishes the communication connection to the mobile phone 1310, so that the mobile phone 1310 can be prevented from frequently switching networks. Certainly, in some embodiments, the mobile phone 1310 may alternatively first connect to the Wi-Fi hotspot of the smart device 1330, and then perform operations such as the authorization and the verification. When the device management APP 1313 needs to be downloaded, the mobile phone 1310 switches to a Wi-Fi network for daily work of the mobile phone 1310 or a mobile network provided by an operator. After the download is completed, the mobile phone 1310 re-switches to the Wi-Fi hotspot of the smart device 1330.

S72: After the smart device 1330 establishes the communication connection to the mobile phone 1310, the device discovery APP 1311 notifies the device management APP 1313 that the device management APP 1313 can communicate with the smart device 1330.

S73: The device management APP 1313 communicates with the smart device 1330 based on a Wi-Fi communications protocol between the smart device 1330 and the mobile phone 1310, and notify the smart device 1330 to switch a network. A network switching notification message is exchanged to the smart device 1330 in a unicast manner by using a UDP protocol or the like. In this way, a password of the home Wi-Fi hotspot 1340 does not need to be broadcast, thereby improving security of a network configuration process.

S74 and S75: The smart device 1330 disables the Wi-Fi hotspot of the smart device 1330 based on the received network switching notification message, and connects to the home Wi-Fi hotspot 1340 based on the SSID and the password that are of the to-be-connected wireless network (that is, the home Wi-Fi) and that are included in the received network switching notification message.

S76: After establishing a communication connection to the home Wi-Fi hotspot 1340, the smart device 1330 sends, to the cloud server 1320 of the device, a message indicating that network configuration of the device succeeds.

S77: Because the Wi-Fi hotspot established by the smart device 1330 has been disabled, the mobile phone 1310 may automatically connect to an originally connected Wi-Fi hotspot, for example, the home Wi-Fi hotspot 1340. Alternatively, when the mobile phone 1310 is originally in a state in which Wi-Fi is not enabled, after the Wi-Fi hotspot created by the smart device 1330 is disabled, the mobile phone 1310 may also disable Wi-Fi.

S78: After receiving the message, the cloud server 1320 of the smart device 1330 may notify the device management APP 1313 that network configuration of the smart device 1330 succeeds.

S79: After receiving a message sent by the cloud server 1320, the device management APP 1313 sends a message to the device discovery APP 1311, to notify the device discovery APP 1311 that network configuration of the smart device 1330 succeeds. In addition, the device management APP 1313 may prompt the user that network configuration succeeds, for example, prompt the user by using a sound or a UI change.

S80: After receiving the message indicating that network configuration succeeds, the device discovery APP 1311 may update the UI, to prompt the user that network configuration of the smart device 1330 succeeds, or prompt the user that configuration of a next smart device can be continued, or the like.

For example, according to some embodiments of this application, in a case in which the mobile phone 1310 shown in FIG. 5B needs to perform network configuration of a plurality of devices, after network configuration of the "brand-A sweeping robot" succeeds, as shown in FIG. 10, a UI of the device discovery APP 1311 may return to a device list, to prompt the user that configuration of a next device "brand-B desk lamp" can be performed.

Figure 13A:
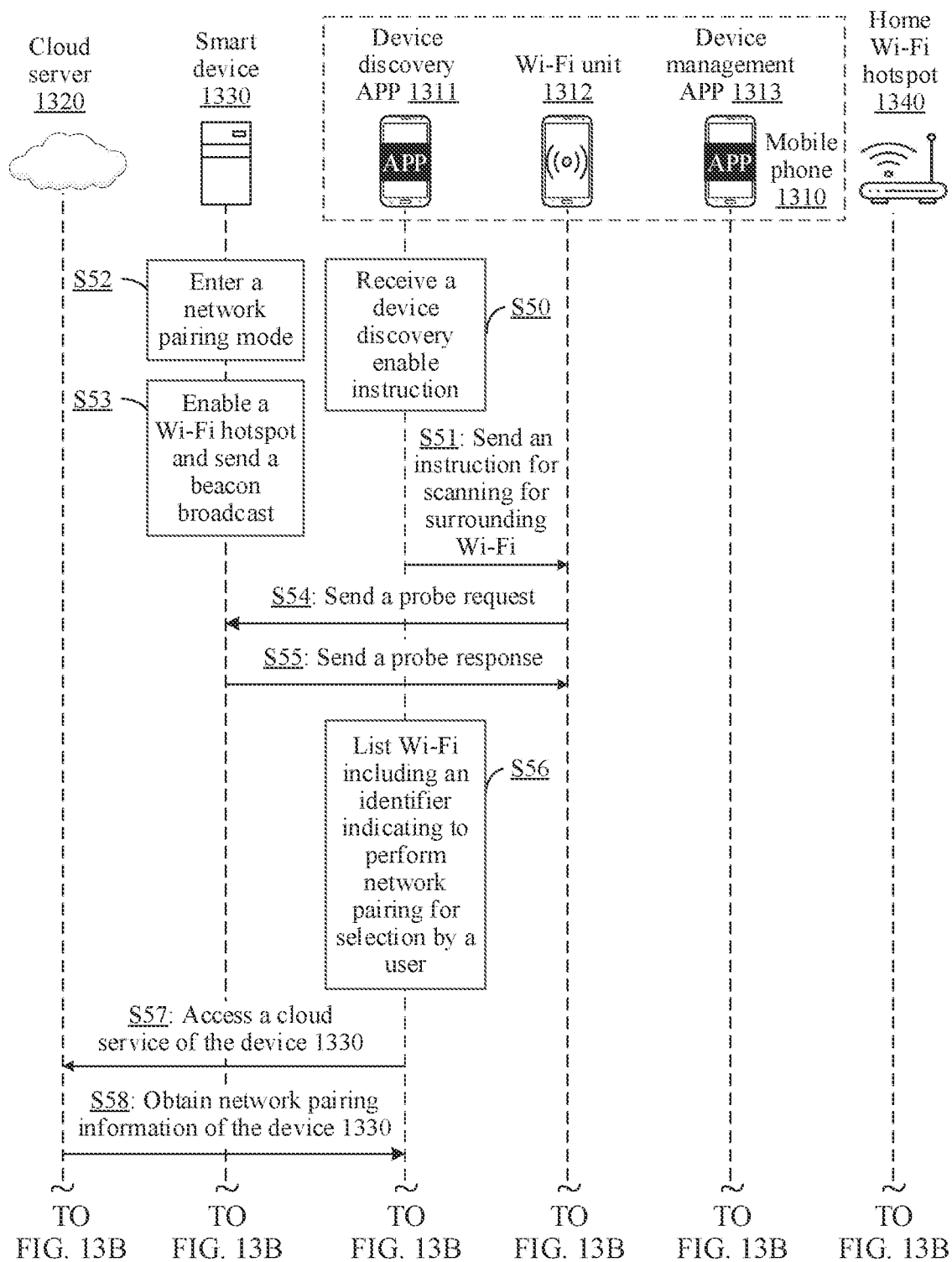
FIG. 13A to FIG. 13C show an example of a network configuration process in which a mobile phone is used as a station and a smart device is used as an AP according to an embodiment of this application.
Figure 13B:
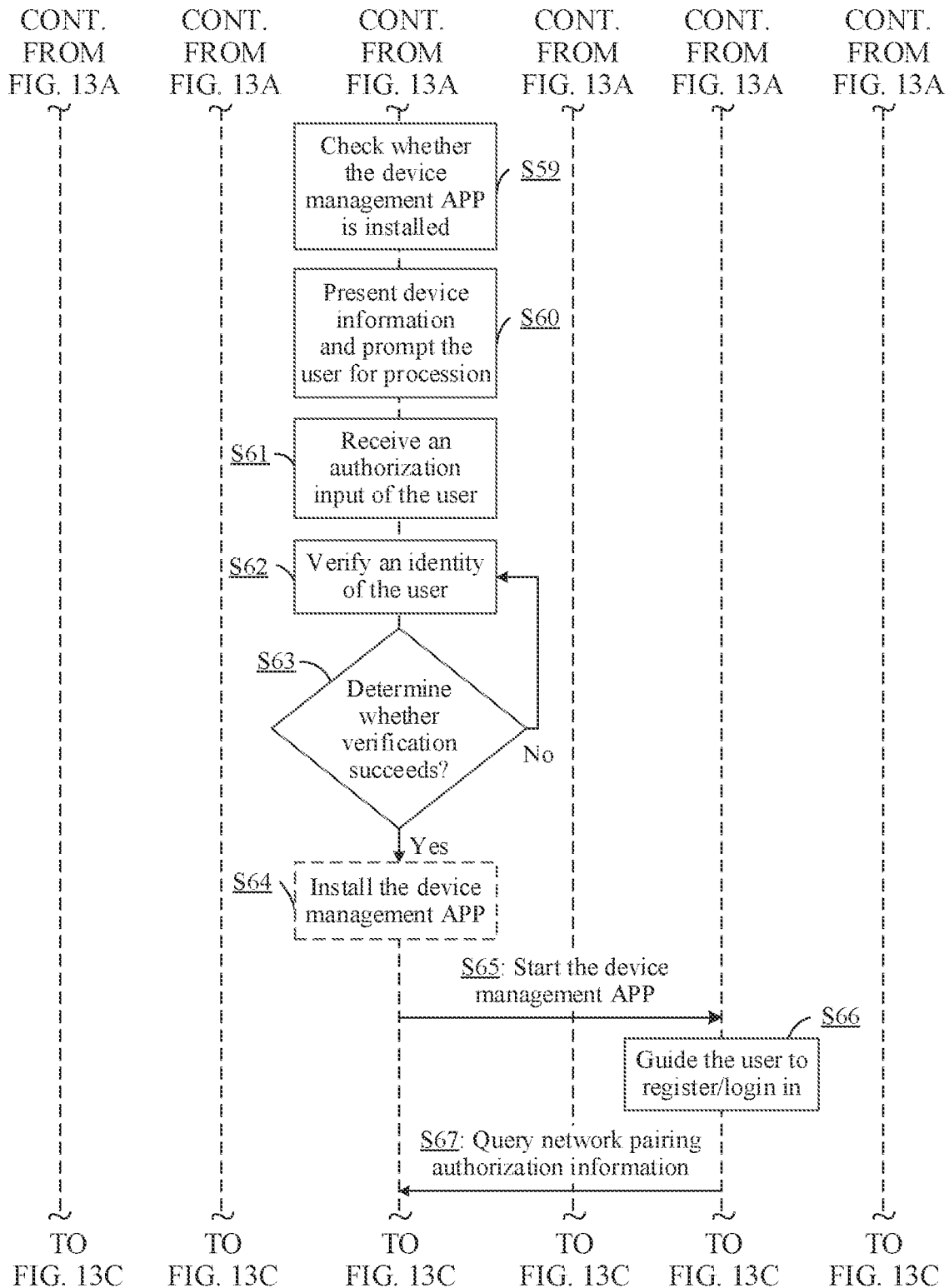
Figure 13C:
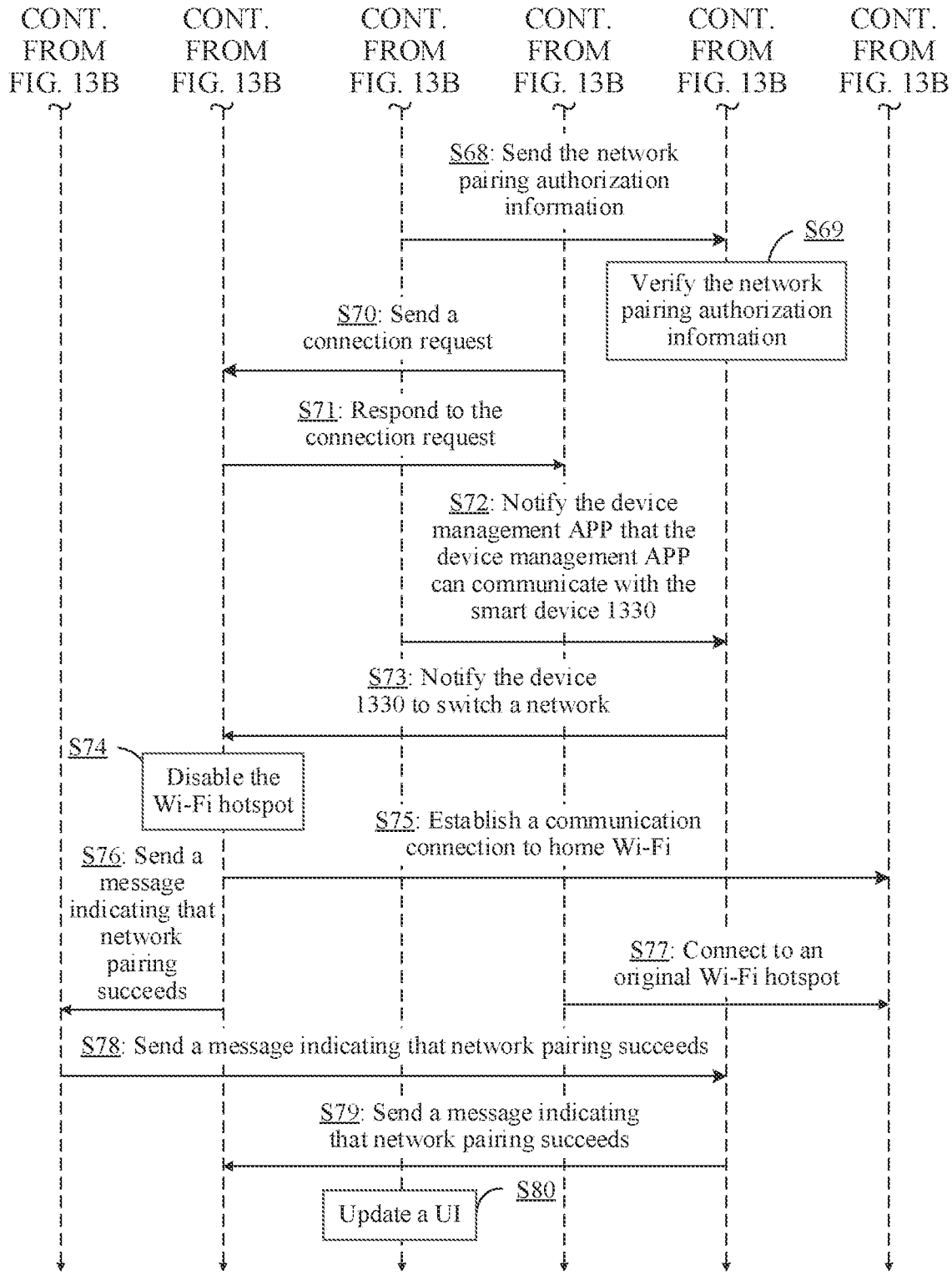

With reference to FIG. 13A to FIG. 13C, some embodiments in which a smart device is in an AP mode and a mobile phone is used as a station are provided. In these embodiments of this application, the device discovery APP 1311 is also provided to guide the user to install the device management APP 1313 provided by the manufacturer of the smart device 1330, to complete the network configuration network configuration of the device.

In addition, similar to the embodiments provided with reference to FIG. 3A to FIG. 3C, in a case in which the device management APP 1313 of the manufacturer is installed on the mobile phone 1310, if the user has performed authorization before, the user may directly open the device management APP 1313 without performing an authorization operation before opening the device management APP 1313. For example, a network configuration process is interrupted after the user installs the device management APP 1313 of the manufacturer, and subsequently, the user opens the device management APP 1311 again to continue to perform a network configuration operation. In this case, some information related to the smart device 1330, for example, the device name and the information that is of the device management APP and that is provided by the manufacturer, is directly displayed for the user in the operation of S60, and the user is prompted to open the App. After an instruction for opening the APP that is input by the user is received, the operations of S61 to S64 in FIG. 13B are skipped, S65 is directly performed, to match and jump to the installed device management APP 1313 of the device manufacturer.

Some embodiments of this application provided with reference to FIG. 13A to FIG. 13C are similar to the embodiments provided with reference to FIG. 3A to FIG. 3C. In the embodiments provided with reference to FIG. 13A to FIG. 13C, a device discovery APP 311 is also provided to guide the user to install the device management APP 313 provided by the manufacturer of the smart device 330, and the device network configuration assistance API is provided to be invoked by the device management APP 313 of the manufacturer, to assist the device management APP 313 of the manufacturer in completing the network configuration of the device, thereby simplifying an operation of authorizing the smart device 330 to connect to the home Wi-Fi hotspot 340.

For a user, when performing network configuration of smart devices, the user also does not need to search for and install each corresponding device management APP 313 for each smart device 330, but can directly use a general APP such as the device discovery APP 311 to automatically search for and install each corresponding device management APP 313, thereby facilitating and simplifying a network configuration operation for the smart device. In addition, in either of the mode shown in FIG. 3A to FIG. 3C or the mode shown in FIG. 13A to FIG. 13C that are used for network configuration, interfaces provided for the user are similar, so that the user can conveniently complete an entire network configuration process by performing very intuitive and simple operations.

Figure 14:
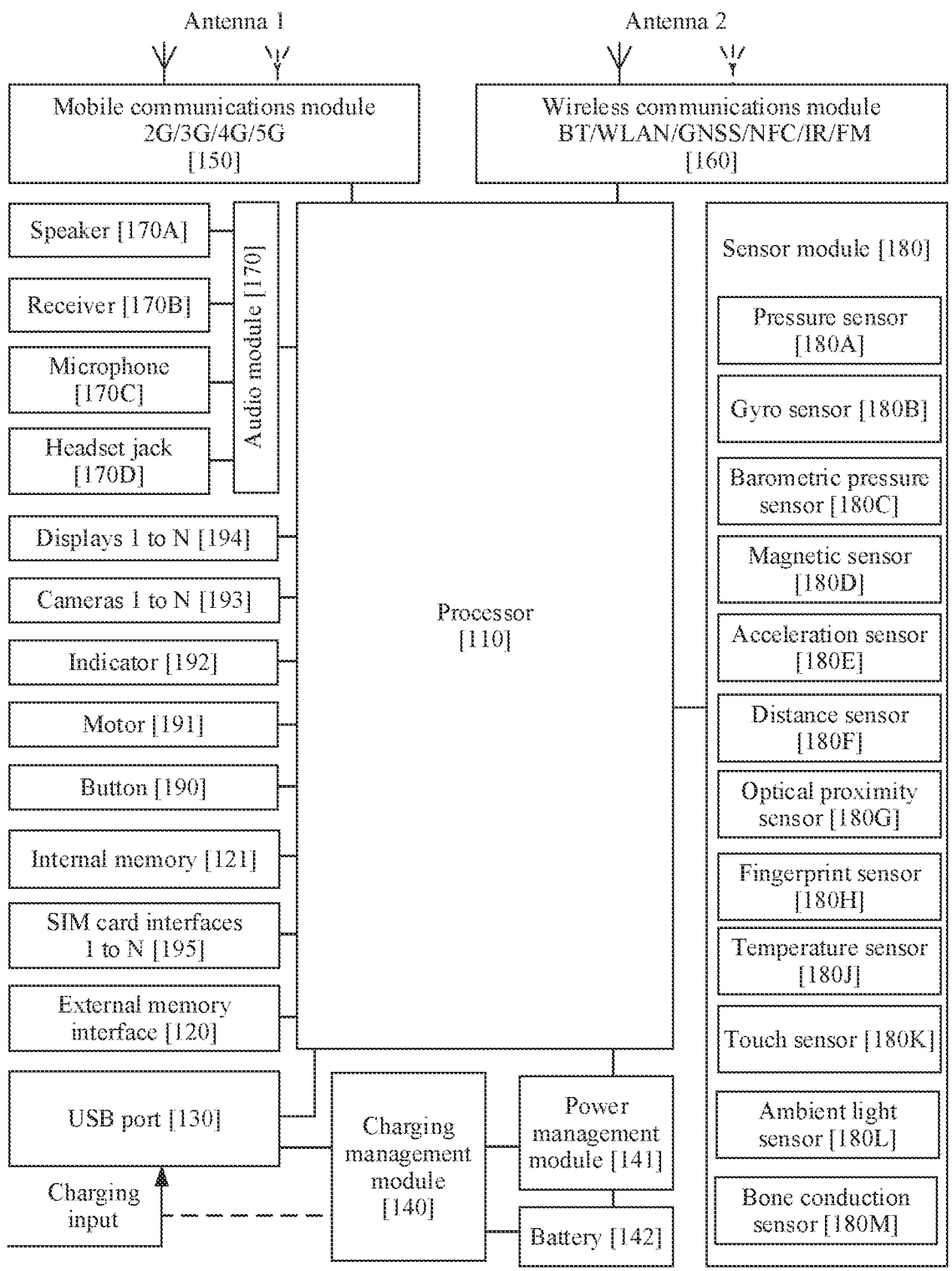
FIG. 14 is a schematic diagram of a structure of a control terminal 100 according to an embodiment of this application.

FIG. 14 is a schematic diagram of a structure of a control terminal 100 according to an embodiment of this application.

The control terminal 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 1803, a touch sensor 180K, an ambient light sensor 180L, a bone conduction sensor 180M, and the like.

It may be understood that a structure shown in this embodiment of this application does not constitute a specific limitation on the control terminal 100. In some other embodiments of this application, the control terminal 100 may include more or fewer components than those shown in the figure, or may combine some components, or may split some components, or may have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), and/or the like. Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, and reduces waiting time of the processor 110, so that system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that the interface connection relationship between modules shown in this embodiment of this application is merely an example for description, and does not constitute a structural limitation on the control terminal 100. In some other embodiments of this application, the control terminal 100 may alternatively use an interface connection manner different from that in the foregoing embodiment, or a combination of a plurality of interface connection manners.

The charging management module 140 is configured to receive a charging input from a charger. The power management module 141 is configured to connect the battery 142 and the charging management module 140 to the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the control terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the control terminal 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution, applied to the control terminal 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed m a same device as the mobile communications module 150 or another functional module.

The wireless communications module 160 may provide a solution, applied to the control terminal 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the control terminal 100, the antenna 1 is coupled to the mobile communications module 150, and the antenna 2 is coupled to the wireless communications module 160, so that the control terminal 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite-based augmentation systems, SBAS).

The control terminal 100 implements a display function by using the GPU, the display 194, the application processor, and the like. The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, quantum dot light-emitting diodes (quantum dot light-emitting diodes, QLED), or the like. In some embodiments, the control terminal 100 may include one or N displays 194, where N is a positive integer greater than 1.

The control terminal 100 may implement a photographing function through the ISP, the camera 193, the video codec, the GPU, the display 194, the application processor, and the like.

The external memory interface 120 may be configured to connect to an external memory card such as a micro SD card, to extend a storage capacity of the control terminal 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (for example, audio data or an address book) created in a process of using the control terminal 100, and the like. In addition, the internal memory 121 may include a high-speed random access memory, or may include a nonvolatile memory such as at least one magnetic disk storage device, a flash memory, or a universal flash storage (universal flash storage, UFS). The processor 110 executes various functional applications and data processing of the control terminal 100 by running the instructions stored in the internal memory 121 and/or the instructions stored in the memory disposed in the processor.

The control terminal 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The control terminal 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the control terminal 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. At least one microphone 170C may be disposed in the control terminal 100. In some other embodiments, two microphones 170C may be disposed in the control terminal 100, to collect a sound signal and further implement a noise reduction function. In some other embodiments, three, four, or more microphones 170C may be disposed in the control terminal 100, to collect a sound signal, reduce noise, identify a sound source, implement a directional recording function, and the like.

The headset jack 170D is configured to connect to a wired headset. The headset jack 170D may be a USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The fingerprint sensor 180H is configured to collect a fingerprint. The control terminal 100 may use a feature of the collected fingerprint to implement fingerprint-based unlocking, application lock access, fingerprint-based photographing, fingerprint-based call answering, and the like.

The touch sensor 180K is also referred to as a "touch component". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the control terminal 100 at a location different from that of the display 194.

The button 190 includes a power button, a volume button, and the like. The button 190 may be a mechanical button, or may be a touch button. The control terminal 100 may receive a button input, and generate a key signal input related to a user setting and function control of the control terminal 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the control terminal 100. The control terminal 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external memory card. The control terminal 100 interacts with a network by using the SIM card, to implement functions such as calling and data communication. In some embodiments, the control terminal 100 uses an eSIM, namely, an embedded SIM card. The eSIM card may be embedded in the control terminal 100, and cannot be separated from the control terminal 100.

According to some embodiments of this application, a software system of the control terminal 100 may use a layered architecture, an event-driven architecture, a microkernel architecture, a microservice architecture, or a cloud architecture. In embodiments of this application, an Android system with a layered architecture is used as an example to describe a software structure of the control terminal 100.

Figure 15:
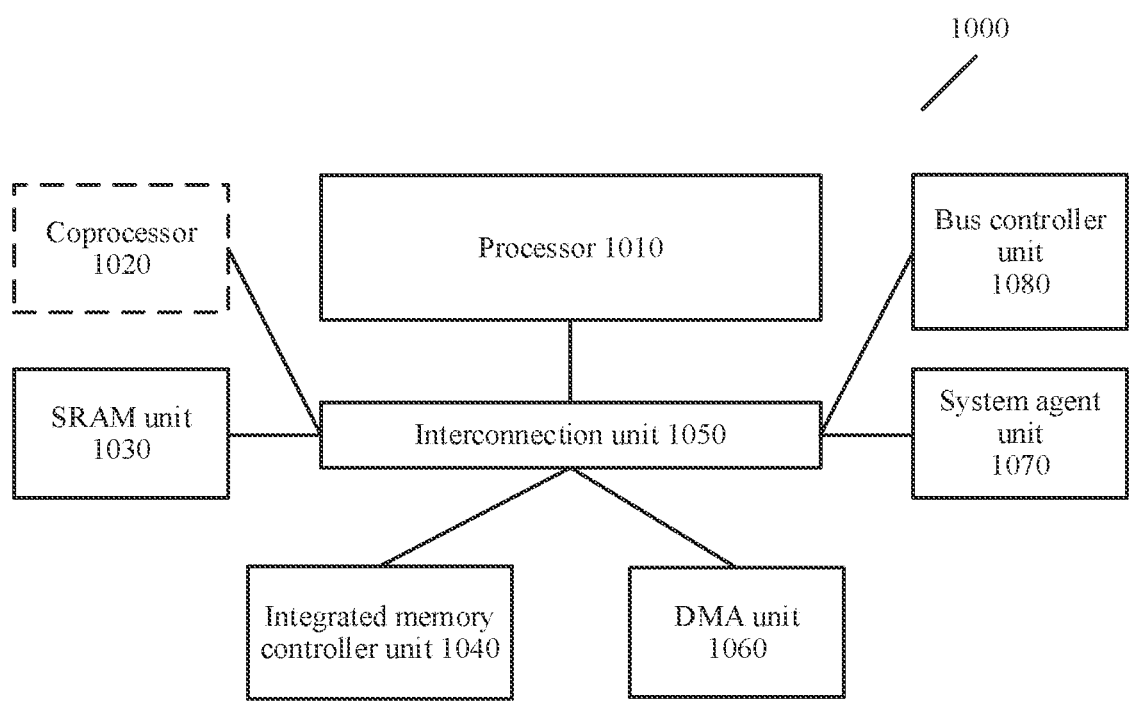
FIG. 15 is a block diagram of a system on chip (SoC) according to an embodiment of this application.

FIG. 15 is a block diagram of a SoC (System on Chip, system on chip) 1000 according to an embodiment of this application. In FIG. 15, a dashed block is an optional feature of the SoC. In FIG. 15, the SoC 1000 includes an interconnection unit 1050 that is coupled to an application processor 1010, a system agent unit 1070, a bus controller unit 1080, an integrated memory controller unit 1040, one group of coprocessors 1020 or one or more coprocessors 1020 that may include integrated graphics logic, an image processor, an audio processor, and a video processor, a static random access memory (SRAM) unit 1030, and a direct memory access (DMA) unit 1060. In an embodiment, the coprocessor 1020 may include a dedicated processor, for example, a network or communications processor, a compression engine, a GPGPU, a high throughput/throughout MIC processor, or an embedded processor.

Embodiments disclosed in this application may be implemented in hardware, software, firmware, or a combination of these implementation methods. Embodiments of this application may be implemented as a computer program or program code executed in a programmable system. The programmable system may include at least one processor, a storage system (including a volatile memory, a nonvolatile memory, and/or a storage element), at least one input device, and at least one output device.

The program code may be configured to input instructions, to perform functions described in this application and generate output information. The output information may be applied to one or more output devices in a known manner. For a purpose of this application, a processing system includes any system having a processor such as a digital signal processor (DSP), a microcontroller, an application-specific integrated circuit (ASIC), or a microprocessor.

The program code may be implemented by using a high-level programming language or an object-oriented programming language, to communicate with the processing system. The program code may alternatively be implemented by using an assembly language or a machine language when needed. Actually, the mechanism described in this application is not limited to a scope of any particular programming language. In any case, the language may be a compiled language or an interpretive language.

In some cases, the disclosed embodiments may be implemented in hardware, firmware, software, or any combination thereof. The disclosed embodiments may also be implemented in a form of instructions or programs carried or stored on one or more transient or non-transient machine readable (for example, computer readable) storage media, and the instructions or the programs may be read and executed by one or more processors or the like. When the instructions or the programs are run by a machine, the machine may perform the foregoing various methods. For example, the instructions may be distributed through a network or another computer readable medium. Therefore, the machine readable medium may include but is not limited to any mechanism used to store or transmit information in a machine (for example, computer) readable form, for example, a floppy disk, a compact disc, a compact disc read-only memory (CD-ROMs), a magnetic disc, a read-only memory (ROM), a random access memory (RAM), an erasable programmable read-only memory (EPROM), an electronically erasable programmable read-only memory (EEPROM), a magnetic card, an optical card, a flash memory used to transmit network information by using an electrical signal, an optical signal, an acoustic signal, or another form of signal (for example, a carrier, an infrared signal, or a digital signal), or a tangible machine readable memory. Therefore, the machine readable medium includes any form of machine readable medium that is suitable for storing or transmitting electronic instructions or machine (for example, computer) readable information.

Therefore, embodiments of this application further include a non-transient tangible machine readable medium. The medium includes instructions or design data, for example, a hardware description language (HDL), and defines a structure, a circuit, an apparatus, a processor, and/or a system feature described in this specification. These embodiments are also referred to as program products.

It should be understood that although terms such as "first" and "second" may be used herein to describe various features, these features should not be limited by these terms. These terms are merely used for distinction, and shall not be understood as an indication or implication of relative importance. For example, without departing from the scope of the example embodiments, a first feature may be referred to as a second feature, and similarly the second feature may be referred to as the first feature.

Furthermore, various operations will be described as a plurality of separate operations in a manner that is most conducive to understanding illustrative embodiments. However, a described sequence should not be construed as implying that these operations must depend on the described sequence. Many of these operations may be performed in parallel, concurrently, or simultaneously. In addition, the sequence of the operations may further be rearranged. The processing may be terminated when the described operations are completed, but may also have additional operations not included in the figures. The processing may correspond to a method, a function, a procedure, a subroutine, a subprogram, or the like.

References to "an embodiment". "embodiments", "an illustrative embodiment", and the like in the specification indicate that the described embodiment may include a specific feature, structure, or property, but each embodiment may not or may not necessarily include the specific feature, structure, or property. In addition, these phrases are not necessarily intended for a same embodiment. In addition, when specific features are described with reference to specific embodiments, knowledge of persons skilled in the art can affect combination of these features with other embodiments, regardless of whether these embodiments are explicitly described.

Unless otherwise stated, terms "contain", "have", and "include" are synonymous. A phrase "A/B" indicates "A or B". The phrase "A and/or B" means "(A), (B), or (A and B)".

As used herein, the term "module" may refer to being a part thereof, or include a memory (a shared memory, a dedicated memory, or a group memory) for running one or more software or firmware programs, an application-specific integrated circuit (ASIC), an electronic circuit and/or a processor (a shared processor, a dedicated processor, or a group processor), a combined logic circuit, and/or another appropriate component that provides the function.

In the accompanying drawings, some structural or method features may be shown in a specific arrangement and/or order. However, it should be understood that such a specific arrangement and/or order is not required. In some embodiments, these features may be described in a manner and/or order different from that shown in the descriptive accompanying drawings. In addition, structure or method features included in a specific accompanying drawing do not mean that all embodiments need to include such features. In some embodiments, these features may not be included, or these features may be combined with other features.

Embodiments of this application are described above in detail with reference to the accompanying drawings. However, use of the technical solutions of this application is not limited to various applications mentioned in embodiments of this application, and various structures and variations may be easily implemented with reference to the technical solutions of this application, to achieve various beneficial effects mentioned in this specification. Without departing from the purpose of this application, any variation made within the scope of knowledge possessed by persons of ordinary skill in the art shall fall within the scope of this application.

What is claimed is:

1. A method for guiding a smart device to couple to a wireless network, wherein the method comprises:
    sending, by the smart device, a device identifier (ID) and a cloud service address that are of the smart device to a control terminal;
    receiving, by the control terminal, the device ID and the cloud service address from the smart device;
    sending, by the control terminal based on the device ID, a network configuration information obtaining request to a cloud server corresponding to the cloud service address, wherein the information obtaining request requests network configuration information for the smart device to couple to the wireless network;
    sending, by the cloud server in response to the network configuration information obtaining request, the network configuration information to the control terminal;
    receiving, by the control terminal, the network configuration information;
    determining, by the control terminal based on the network configuration information, a management application of the smart device; and
    sending, by the control terminal, the network configuration information to the management application to guide the smart device to couple to the wireless network.

2. The method of claim 1, wherein before sending the device ID and the cloud service address, the method further comprises:
    sending, by the control terminal, a Wi-Fi broadcast signal; and
    sending, by the smart device based on the Wi-Fi broadcast signal, a probe request signal to the control terminal, wherein the probe request signal comprises the device ID and the cloud service address.

3. The method of claim 1, wherein before sending the device ID and the cloud service address, the method further comprises:
    sending, by the smart device, a Wi-Fi broadcast signal;
    sending, by the control terminal based on the Wi-Fi broadcast signal, a probe request signal to the smart device; and
    sending, by the smart device based on the probe request signal, a probe response signal to the control terminal, wherein the probe response signal comprises the device ID and the cloud service address.

4. The method of claim 1, wherein before sending the network configuration information to the management application, the method further comprises:
    downloading, by the control terminal, the management application from the cloud server; and
    installing, by the control terminal, the management application.

5. The method of claim 1, wherein before sending the network configuration information, the method further comprises:
    determining, by the control terminal, that the management application is installed on the control terminal; and
    guiding, by the control terminal in response to determining that the management application is installed on the control terminal, a user to open the management application.

6. A method for guiding a smart device to couple to a wireless network, wherein the method is implemented by a control terminal, and wherein the method further comprises:
    receiving, from the smart device, a device identifier (ID) and a cloud service address that are of the smart device;
    obtaining, based on the device ID and from a cloud server corresponding to the cloud service address, network configuration information for the smart device to couple to the wireless network;
    determining a management application of the smart device; and
    sending the network configuration information to the management application to guide the smart device to couple to the wireless network.

7. The method of claim 6, wherein before sending the network configuration information, the method further comprises:
    downloading the management application from the cloud server; and
    installing the management application.

8. The method of claim 6, wherein before sending the network configuration information, the method further comprises:
    determining that the management application is installed on the control terminal; and
    guiding, in response to determining that the management application is installed on the control terminal, a user to open the management application.

9. The method of claim 6, wherein before sending the network configuration information, the method further comprises:
    obtaining network information of a second wireless network that is selected by a user and to which the smart device is to couple;
    performing a verification of an identity of the user;
    identifying that the verification has succeeded; and
    sending the network information to the management application to couple the smart device to the second wireless network.

10. The method of claim 6, wherein before receiving the device ID and the cloud service address, the method further comprises:
    sending a Wi-Fi broadcast signal; and
    receiving, from the smart device and in response to the Wi-Fi broadcast signal, a probe request signal comprising the device ID and the cloud service address.

11. The method of claim 10, wherein the Wi-Fi broadcast signal comprises information indicating that a coupling of the smart device to the wireless network is supported.

12. The method of claim 10, further comprising:
    receiving, from the management application, a message indicating that the smart device is coupled to the wireless network;
    displaying information indicating that network configuration of the smart device has succeeded; and
    disabling the Wi-Fi broadcast signal.

13. The method of claim 6, wherein before receiving the device ID and the cloud service address, the method further comprises:
    receiving, from the smart device, a Wi-Fi broadcast signal
    sending, to the smart device, a probe request signal; and
    receiving, from the smart device and in response to the probe request signal, a response signal comprising the device ID and the cloud service.

14. The method of claim 13, wherein before sending the network configuration information, the method further comprises:

downloading, from the cloud server, the management application; and establishing a Wi-Fi coupling to the smart device after downloading the management application.

15. The method of claim 14, further comprising:

receiving, from the management application, a message indicating that the smart device is coupled to the wireless network;

displaying information indicating that network configuration of the smart device has succeeded; and decoupling the Wi-Fi coupling to the smart device.

16. The method of claim 10, wherein before sending the Wi-Fi broadcast signal, the method further comprises:

displaying a user interface comprising a first mode and a second mode; and determining that the first mode has been selected.

17. The method of claim 13, wherein before receiving the Wi-Fi broadcast signal, the method further comprises:

displaying a user interface comprising a first mode and a second mode; and determining that the second mode has been selected.

18. The method of claim 16, wherein after determining the management application, the user interface further comprises a plurality of the network configuration information and corresponding information related to the management application and an interaction option guiding a user to download or open the management application.

19. A control terminal comprising:

a memory configured to store instructions; and a processor coupled to the memory and configured to execute the instructions to cause the control terminal to:

receive, from a smart device, a device identifier (ID) and a cloud service address that are of the smart device;

obtain, based on the device ID and from a cloud server corresponding to the cloud service address, network configuration information for the smart device to couple to a wireless network;

determine a management application of the smart device; and send the network configuration information to the management application to guide the smart device to couple to the wireless network.

20. The control terminal of claim 19, wherein before sending the network configuration information, the processor is further configured to execute the instructions to cause the control terminal to:

download the management application from the cloud server; and install the management application.

* * * * *